(12) United States Patent
Sun et al.

(10) Patent No.: US 11,924,785 B2
(45) Date of Patent: Mar. 5, 2024

(54) SYNCHRONIZATION SIGNAL BLOCK PATTERN WITH GAPS

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Juan Montojo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/199,100

(22) Filed: Mar. 11, 2021

(65) Prior Publication Data

US 2021/0289455 A1    Sep. 16, 2021

Related U.S. Application Data

(60) Provisional application No. 62/989,565, filed on Mar. 13, 2020.

(51) Int. Cl.
    *H04W 56/00*       (2009.01)
    *H04L 1/00*        (2006.01)
    (Continued)

(52) U.S. Cl.
    CPC ......... *H04W 56/001* (2013.01); *H04L 1/0068* (2013.01); *H04L 5/0051* (2013.01); *H04W 16/28* (2013.01); *H04W 74/0816* (2013.01)

(58) Field of Classification Search
    CPC .............. H04W 56/001; H04W 16/28; H04W 74/0816; H04L 1/0068; H04L 5/0051;
    (Continued)

(56) References Cited

U.S. PATENT DOCUMENTS

| 2018/0376454 A1 | 12/2018 | Strom et al. |
| 2020/0275420 A1* | 8/2020 | Chen ............... H04W 68/00 |

(Continued)

FOREIGN PATENT DOCUMENTS

| WO | 2019066482 A1 | 4/2019 |
| WO | 2019096298 A1 | 5/2019 |
| WO | 2020024102 A1 | 2/2020 |

OTHER PUBLICATIONS

International Search Report and Written Opinion—PCT/US2021/022209—ISA/EPO—dated Jun. 8, 2021.

*Primary Examiner* — Eric Myers
(74) *Attorney, Agent, or Firm* — Patterson + Sheridan, L.L.P.

(57) ABSTRACT

Certain aspects of the present disclosure provide techniques for synchronization signal block (SSB) patterns with gaps. A method that may be performed by a network entity (e.g., a BS) generally includes determining a synchronization signal block (SSB) pattern that identifies SSB positions for sweeping a set of SSB beams over multiple SSB bursts with gaps between at least some of the SSB positions, wherein the SSB pattern identifies a subset of the set of SSB beams to use per SSB burst. The method generally includes transmitting SSBs over the multiple SSB bursts in accordance with the pattern.

26 Claims, 18 Drawing Sheets

(51) Int. Cl.
  *H04L 5/00*      (2006.01)
  *H04W 16/28*   (2009.01)
  *H04W 74/08*   (2009.01)

(58) Field of Classification Search
  CPC ..... H04L 5/001; H04L 5/0048; H04L 5/0023; H04B 7/0617
  See application file for complete search history.

(56) References Cited

U.S. PATENT DOCUMENTS

2020/0280859 A1* 9/2020 Kim ................... H04W 72/042
2020/0404601 A1* 12/2020 Lin .................... H04W 56/001
2021/0307061 A1* 9/2021 Huang ................ H04W 74/006

* cited by examiner

SYNCHRONIZATION SIGNAL BLOCK PATTERN WITH GAPS

CROSS-REFERENCE TO RELATED APPLICATION(S)

This application claims benefit of and priority to U.S. Provisional Application No. 62/989,565, filed Mar. 13, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for transmitting synchronization signal blocks (SSBs) according to patterns with gaps.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved blind decoding and channel estimation (BD/CE) limitations and configuration of new radio (NR) physical downlink control channel (PDCCH) repetition.

Certain aspects of the subject matter described in this disclosure can be implemented in a method for wireless communication by a network entity. The method generally includes determining a synchronization signal block (SSB) pattern that identifies SSB positions for sweeping a set of SSB beams over multiple SSB bursts with gaps between at least some of the SSB positions, wherein the SSB pattern identifies a subset of the set of SSB beams to use per SSB burst. The method generally includes transmitting SSBs over the multiple SSB bursts in accordance with the pattern.

Certain aspects of the subject matter described in this disclosure can be implemented in a method for wireless communication by a user equipment (UE). The method generally includes determining a SSB pattern that identifies SSB positions for a network entity to sweep a set of SSB beams over multiple SSB bursts with gaps between at least some of the SSB positions, wherein the SSB pattern identifies a subset of the set of SSB beams to use per SSB burst. The method generally includes monitoring SSBs over the multiple SSB bursts in accordance with the pattern.

Certain aspects of the subject matter described in this disclosure can be implemented in an apparatus for wireless communication. The apparatus generally includes at least one processor a memory coupled to the at least one processor. The memory generally includes code executable by the at least one processor to cause the apparatus to determine an SSB pattern that identifies SSB positions for sweeping a set of SSB beams over multiple SSB bursts with gaps between at least some of the SSB positions, wherein the SSB pattern identifies a subset of the set of SSB beams to use per SSB burst. The memory generally includes code executable by the at least one processor to cause the apparatus to transmit SSBs over the multiple SSB bursts in accordance with the pattern.

Certain aspects of the subject matter described in this disclosure can be implemented in an apparatus for wireless communication. The apparatus generally includes at least one processor a memory coupled to the at least one processor. The memory comprising code executable by the at least one processor to cause the apparatus to determine a SSB pattern that identifies SSB positions for a network entity to sweep a set of SSB beams over multiple SSB bursts with gaps between at least some of the SSB positions, wherein the SSB pattern identifies a subset of the set of SSB beams to use per SSB burst. The memory generally includes code executable by the at least one processor to cause the apparatus to monitor SSBs over the multiple SSB bursts in accordance with the pattern.

Certain aspects of the subject matter described in this disclosure can be implemented in an apparatus for wireless communication. The apparatus generally includes means for determining an SSB pattern that identifies SSB positions for sweeping a set of SSB beams over multiple SSB bursts with gaps between at least some of the SSB positions, wherein the SSB pattern identifies a subset of the set of SSB beams to use per SSB burst. The apparatus generally includes means for transmitting SSBs over the multiple SSB bursts in accordance with the pattern.

Certain aspects of the subject matter described in this disclosure can be implemented in an apparatus for wireless communication. The apparatus generally includes means for determining a SSB pattern that identifies SSB positions for a network entity to sweep a set of SSB beams over multiple SSB bursts with gaps between at least some of the SSB positions, wherein the SSB pattern identifies a subset of the set of SSB beams to use per SSB burst. The apparatus generally includes means for monitoring SSBs over the multiple SSB bursts in accordance with the pattern.

Certain aspects of the subject matter described in this disclosure can be implemented in a computer readable medium storing computer code executable thereon for wireless communication. The computer readable medium generally includes code for determining an SSB pattern that identifies SSB positions for sweeping a set of SSB beams over multiple SSB bursts with gaps between at least some of the SSB positions, wherein the SSB pattern identifies a subset of the set of SSB beams to use per SSB burst. The computer readable medium generally includes code for transmitting SSBs over the multiple SSB bursts in accordance with the pattern.

Certain aspects of the subject matter described in this disclosure can be implemented in a computer readable medium storing computer code executable thereon for wireless communication. The computer readable medium generally includes code for determining a SSB pattern that identifies SSB positions for a network entity to sweep a set of SSB beams over multiple SSB bursts with gaps between at least some of the SSB positions, wherein the SSB pattern identifies a subset of the set of SSB beams to use per SSB burst. The computer readable medium generally includes code for monitoring SSBs over the multiple SSB bursts in accordance with the pattern.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
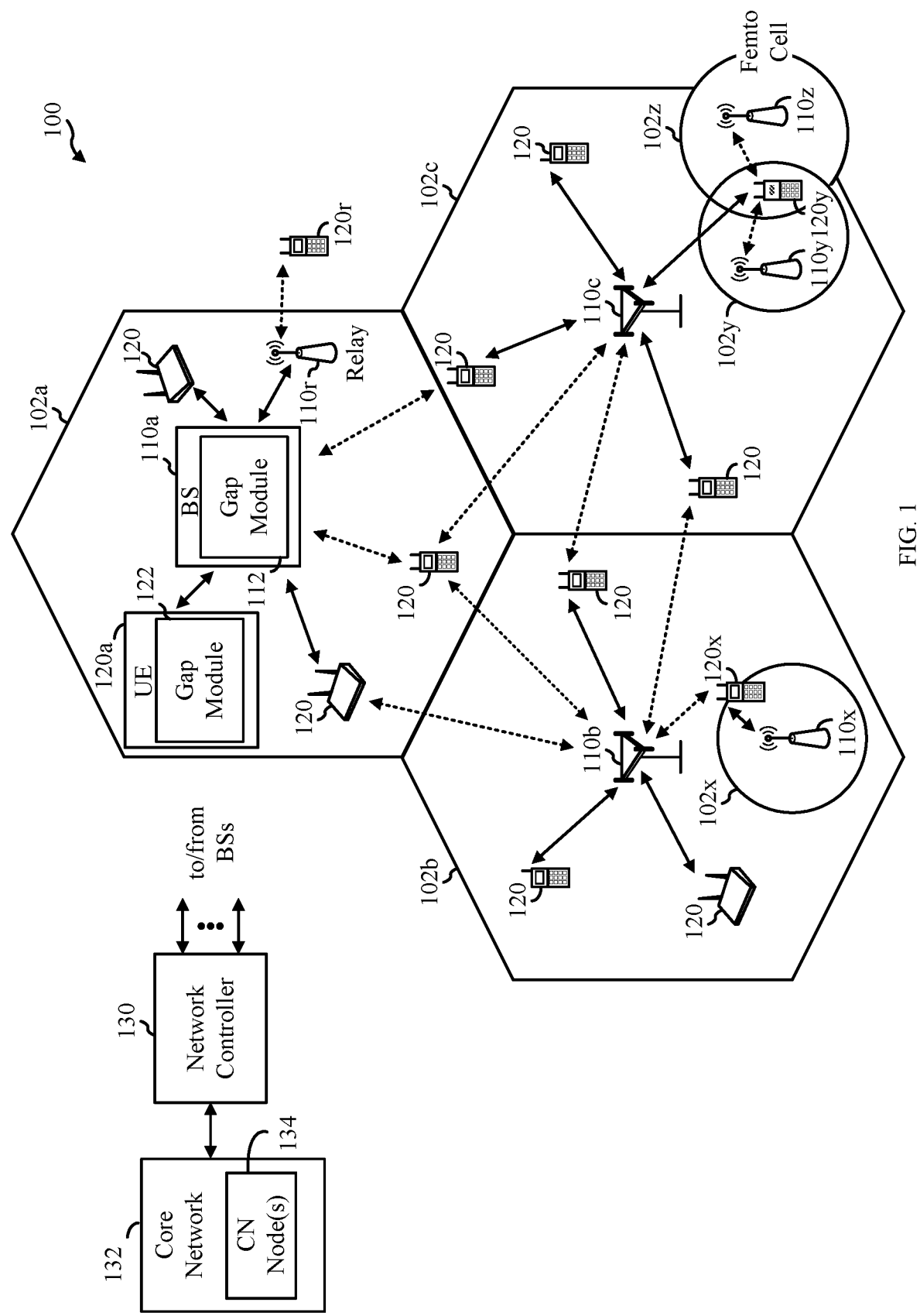
FIG. 1 is a block diagram conceptually illustrating an example wireless communication network, in accordance with certain aspects of the present disclosure.

Aspects of the present disclosure provide apparatus, methods, processing systems, and computer readable mediums for techniques for transmitting synchronization signal block (SSB) according to patterns with gaps.

The following description provides examples for transmitting SSBs according to patterns with gaps, and is not limiting of the scope, applicability, or examples set forth in the claims. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may coexist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may include base stations (BSs) 110 and user equipments (UEs) 120 configured to transmit and monitor for synchronization signal blocks (SSBs) transmitted according to SSB patterns with gaps across multiple SSB bursts. As shown in FIG. 1, the BS 110a includes a gap module 112. The gap module 112 may be configured to perform the operations illustrated in FIG. 7, in accordance with aspects of the present disclosure. Additionally, as shown in FIG. 1, the UE 120a includes a gap module 122. The gap module 122 may be configured to perform the operations illustrated in FIG. 8, as well as other operations disclosed herein for determining SSB patterns with gaps in multiple SSB bursts, in accordance with aspects of the present disclosure.

The wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs and provide coordination and control for these BSs. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
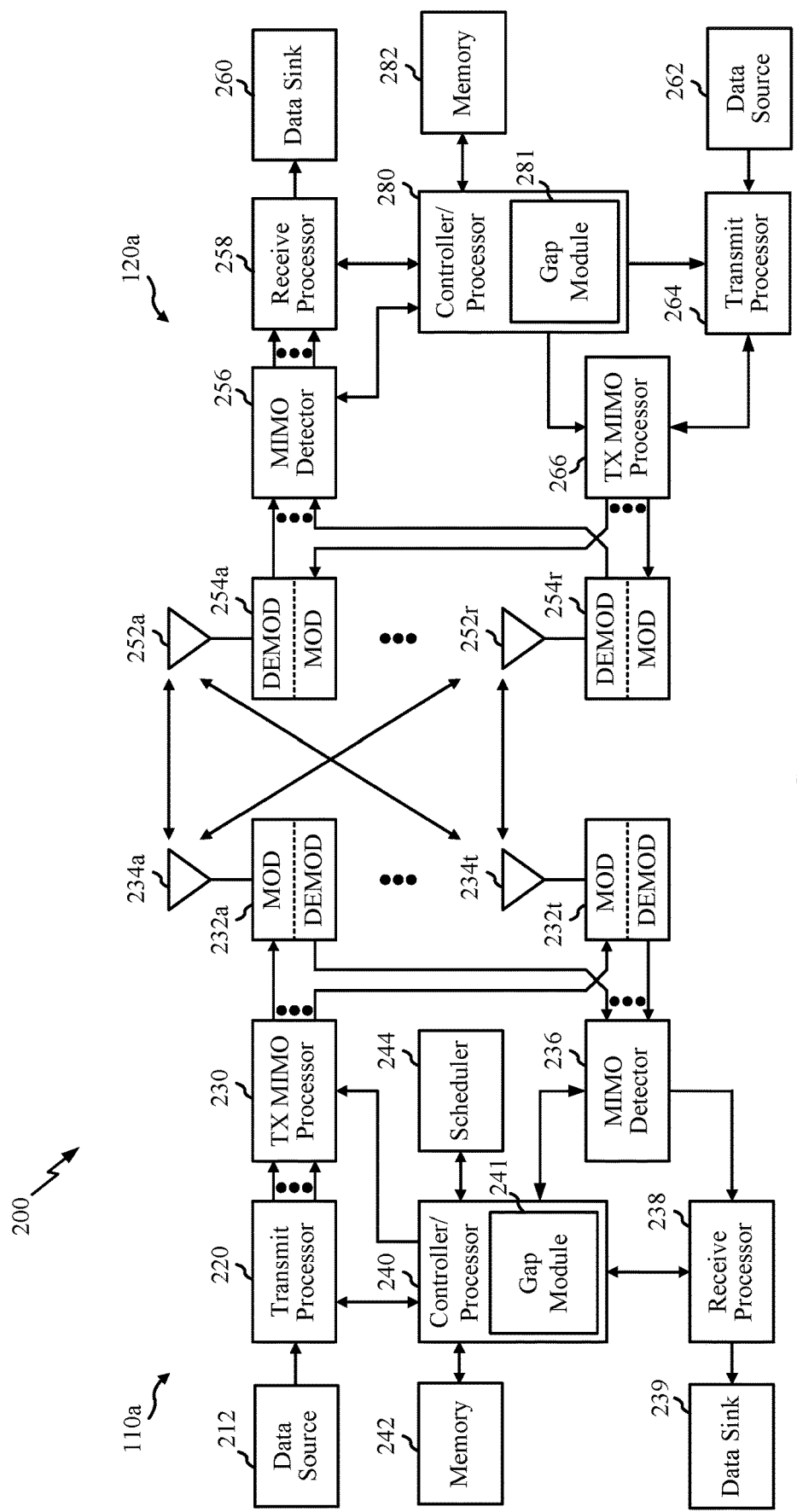
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for determining SSB patterns with gaps in multiple SSB bursts. For example, as shown in FIG. 2, the controller/processor 240 of the BS 110a includes a gap module 241 that may be configured to perform the operations illustrated in FIG. 7, as well as other operations disclosed herein for determining SSB patterns with gaps in multiple SSB bursts, in accordance with aspects of the present disclosure. As shown in FIG. 2, the controller/processor 280 of the UE 120a includes gap module 281 that may be configured to perform the operations illustrated in FIG. 8, as well as other operations disclosed herein for determining SSB patterns with gaps in multiple SSB bursts, in accordance with aspects of the present disclosure. Although shown at the Controller/Processor, other components of the UE 120a and BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
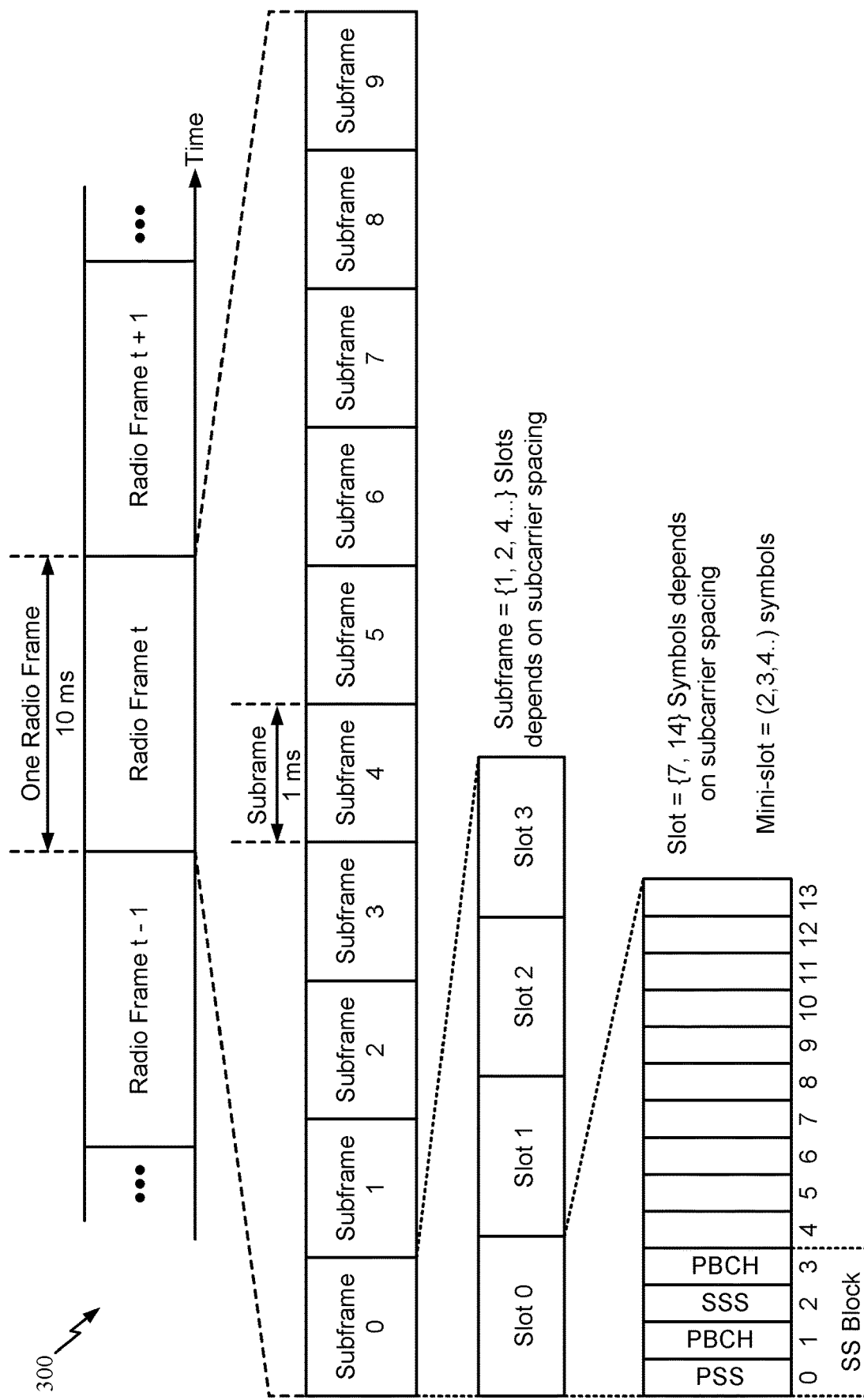
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 4:
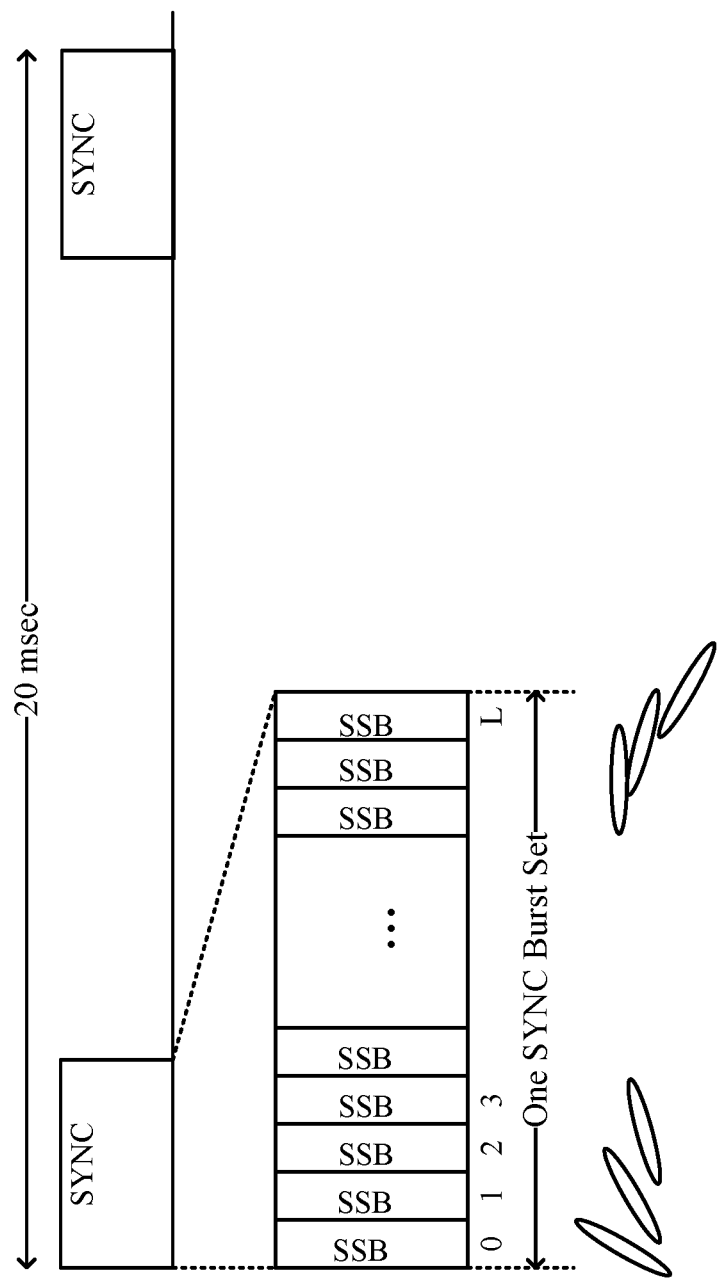
FIG. 4 illustrates how different synchronization signal blocks (SSBs) may be sent using different beams, in accordance with certain aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth (e.g., a specific area on the NR Downlink Resource Grid) and a set of parameters used to carry PDCCH/DCI. For example, a CORESET may by similar in area to an LTE PDCCH area (e.g., the first 1, 2, 3, 4 OFDM symbols in a subframe).

Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. Aggregation levels may be generally defined as the number of CCEs that consist of a PDCCH candidate and may include aggregation levels 1, 2, 4, 8, and 18, which may be configured by a radio resource control (RRC) configuration of a search space set (SS-set). A CORESET may be linked with the SS-set within the RRC configuration. For each aggregation level, the number of PDCCH candidates may be RRC configurable.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a bandwidth part (BWP) and a most significant bit corresponds to the first RB-group in the BWP.

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
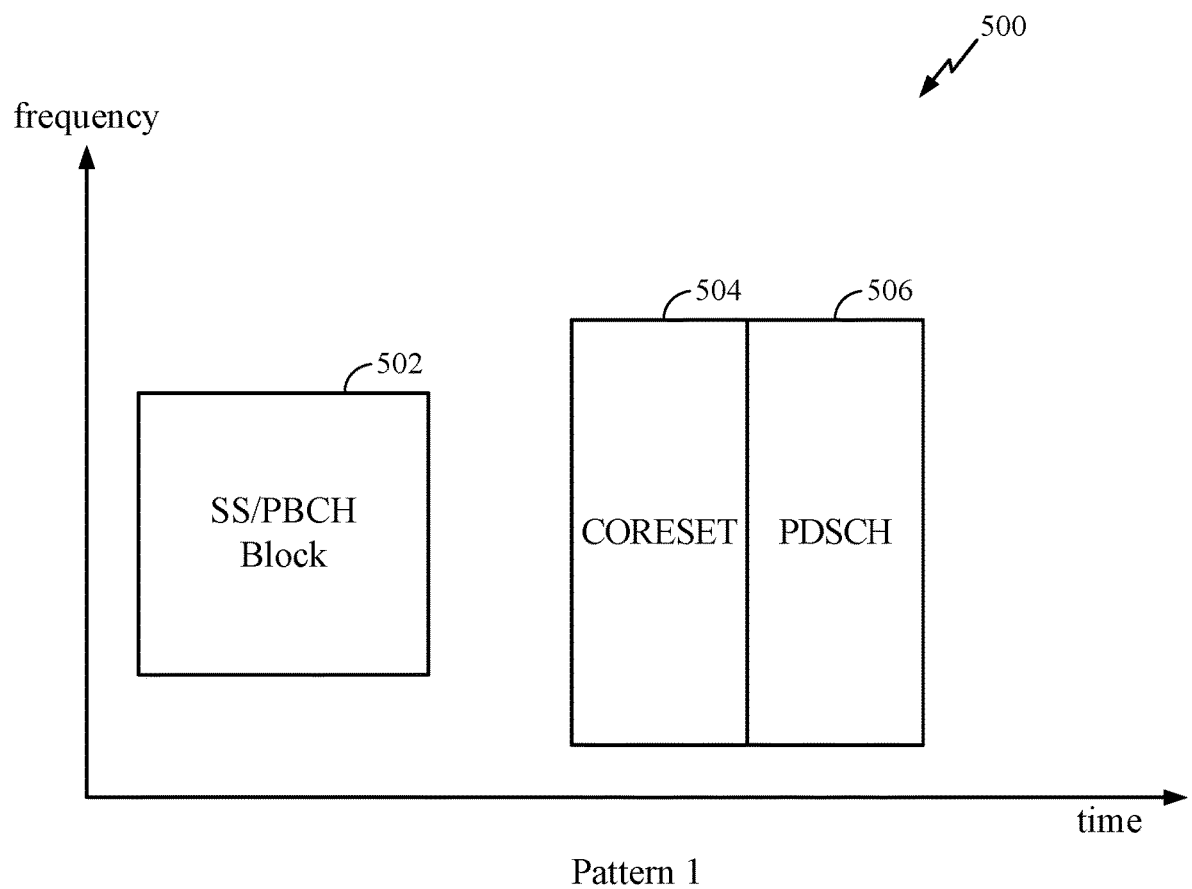
FIG. 5 shows an exemplary transmission resource mapping, according to certain aspects of the present disclosure.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a MIB conveying an index to a table that relates the time and frequency resources of the CORESET 504 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 506. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORE-SET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

Further, REG bundles may be used to convey CORE-SETs. REGs in an REG bundle may be contiguous in a frequency and/or a time domain. In certain cases, the time domain may be prioritized before the frequency domain. REG bundle sizes may include: 2, 3, or 6 for interleaved mapping and 6 for non-interleaved mapping.

Figure 6:
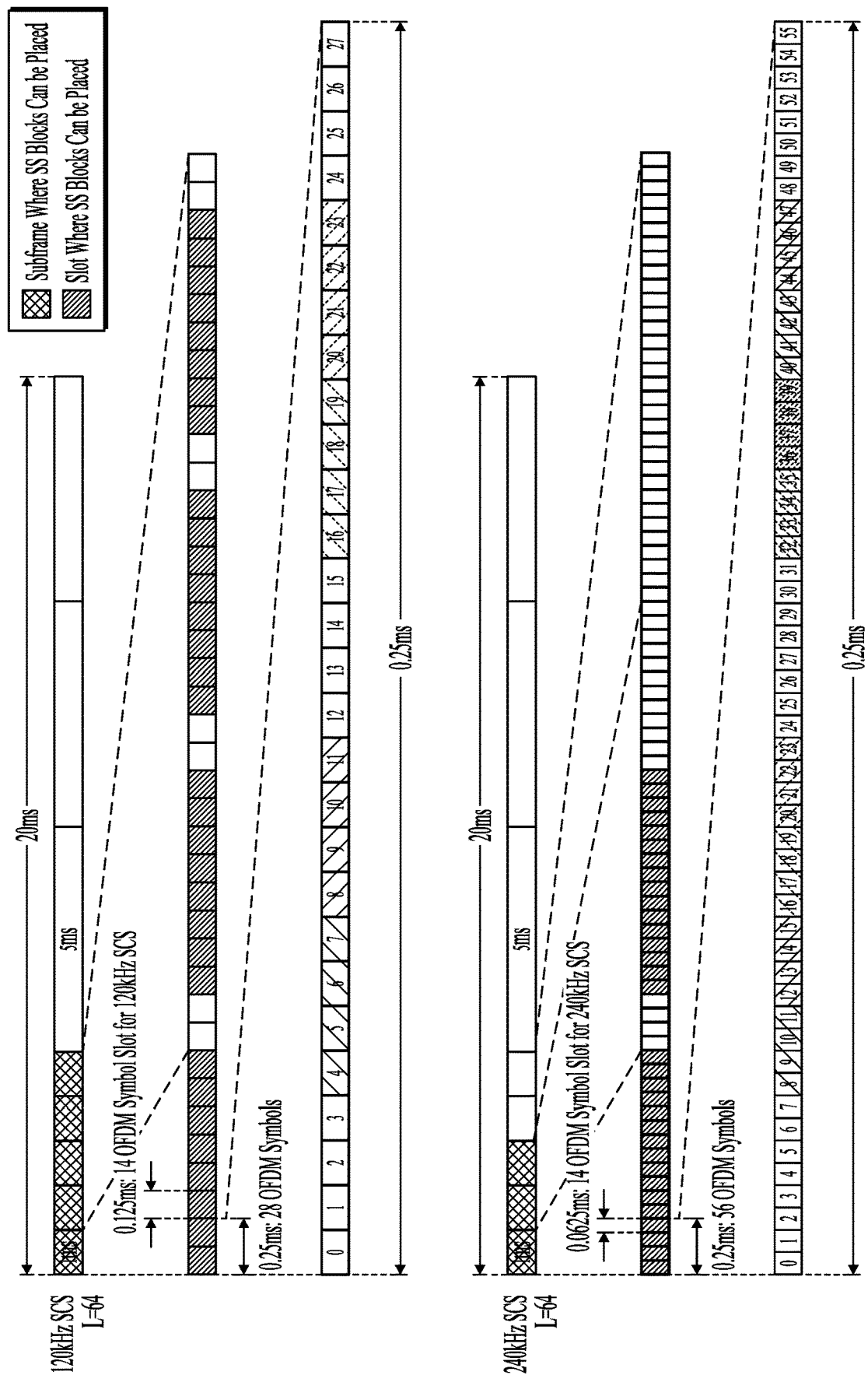
FIG. 6 illustrates examples of SSB patterns for different subcarrier spacings (SCSs), according to certain aspects of the present disclosure.

As noted above, sets of CCEs may be used to transmit new radio PDCCHs (NR-PDCCHs), with different numbers of CCEs in the sets used to transmit NR-PDCCHs using differing aggregation levels. The mapping of PDCCH candidates of an SS set to CCEs of an associated CORESET may be implemented by means of a hash function, as illustrated in FIG. 6. The hash function may randomize the allocation of the PDCCH candidates within CORESET p in slot $n_s$ and may be performed according to:

$$L\{(Y_{p,n_s}+j_{p,m}^{(L)}) \bmod \lfloor N_{CCE,p}/L \rfloor\}+i,$$

where a single carrier operation with a single SS set with index s is assumed for simplicity, L is the aggregation level, $N_{CCE,p}$ is the total number of CCEs for given CORESET p, m (0, 1, ..., $M^{(L)}$–1) is the candidate index with $M^{(L)}$ being the number of PDCCH candidates for AL L, i (0, 1, ..., L–1) is the contiguous CCE index of the PDCCH candidate, $$j_{p,m}^{(L)} = \left\lfloor \frac{m \cdot N_{CCE,p}}{L} \right\rfloor,$$

$Y_{p,n_s}$=0 for a CSS set, $Y_{p,n_s}$ (o, 1, ..., $2_{16}$–1) for a USS set is a pseudo-random variable based on C-RNTI of the UE and slot number $n_s$, and $\lfloor \cdot \rfloor$ denotes a floor operation.

Example Synchronization Signal Block Burst Designs with Gaps

As mentioned, synchronization signal (SS) blocks (SSBs) may be organized into SS bursts to support beam sweeping. SSBs can be transmitted with up to sixty-four different beam directions in 5G new radio (NR), in what may be referred to as an SS burst set. SS blocks in an SS burst set are transmitted in the same frequency region, while SS blocks in different SS burst sets can be transmitted at different frequency locations.

In NR systems, there are defined SSB burst patterns (also referred to herein as SSB patterns) for the SSB burst sets in the Frequency Range 2 (FR2) range (i.e., 24.25 GHz to 52.6 GHz) with 120 kHz subcarrier spacing (SCS) or 240 kHz SCS. FIG. 6 illustrates an example SSB pattern with a 120 kHz subcarrier spacing (SCS), and an example SSB pattern with a 240 kHz SCS. Each SSB pattern indicates the SSB beam to use for transmitting SSBs and also indicates the SSB position of the SSB beam. The SSB burst in the SSB pattern is 5 ms or 2 ms for 120 kHz SSCS and 240 kHz respectively.

While an SSB pattern exists for FR2, there is a need to address SSB patterns in the 60 GHz band. One way to address the need for SSB patterns in the 60 GHz band is to leverage the SSB burst patterns used in FR2 because of the proximity of the 60 GHz band to FR2. However, applying the SSB burst pattern used in FR2 requires modification of the SSB burst patterns for use in the 60 GHz band. For example, because the bandwidth for each channel in the 60 GHz band can be up to 2 GHz, the SSB burst pattern used in FR2 may need to be paired with a higher SCS data transmission (e.g., 960 kHz or larger) as a 120 kHz SCS data transmission may be too narrow.

Even with the modification, many design aspects used with the SSB pattern used in FR2 may be leveraged for the SSB pattern in the 60 GHz band.

There is also a need to send ultra-reliable low-latency communication (URLLC) traffic. Due to the large number of SSB when sweeping multiple directions, it may be desirable to multiplex URLLC data within an SSB burst. Current SSB burst design patterns may not include enough gaps for the URLLC traffic. This need to send URLLC traffic includes URLLC downlink (DL) traffic, which may not fit the same analog beam of the SSB transmission thereby preventing frequency division multiplexing (FDM). URLLC traffic may also include URLLC uplink (UL) traffic and/or control transmissions, where a relatively large downlink (DL)/UL switching gap is needed on top of the transmission time. The URLLC traffic may not be able to wait for the end of the SSB burst before transmitting. In some cases, to address this need, the network can leave gaps in the SSB pattern by sending less SSBs, but sweeping less SSB beams may impact beam management and overall performance.

Aspects of the present disclosure, however, propose SSB patterns that introduce gaps in the SSB burst pattern while not increasing the maximum SSB burst length or reducing the number of beams supported.

Figure 7:
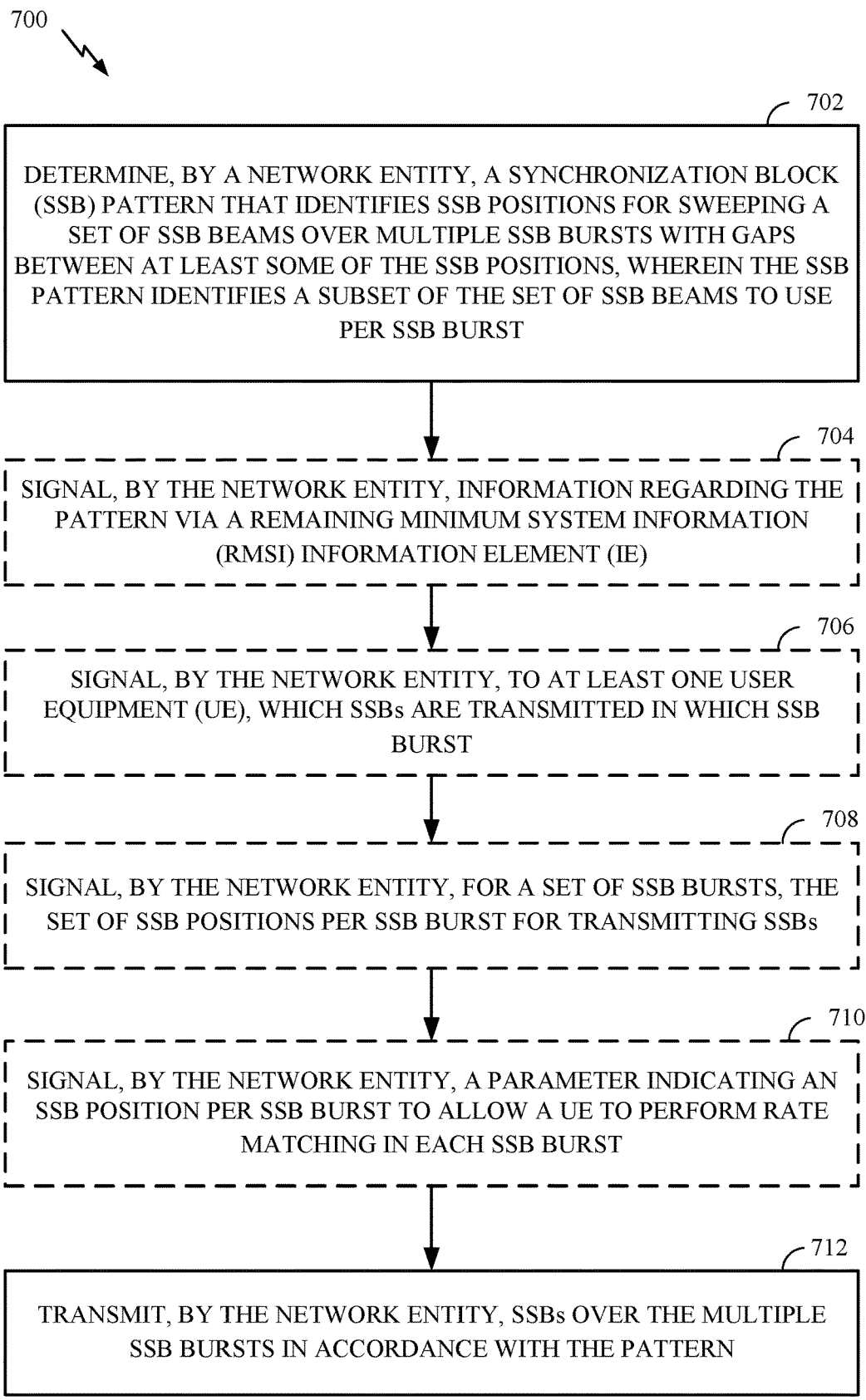
FIG. 7 is a flow diagram illustrating example operations for wireless communication by a network entity, according to certain aspects of the present disclosure.

FIG. 7 is a flow diagram illustrating example operations 700 for wireless communication, in accordance with certain aspects of the present disclosure. The operations 700 may be performed, for example, by a network entity (e.g., such as the BS 110*a* in the wireless communication network 100). The operations 700 may be complementary operations by the network entity to the operations 800 performed by the UE.

Operations 700 begin, at 702, by determining a SSB pattern that identifies SSB positions for sweeping a set of SSB beams over multiple SSB bursts with gaps between at least some of the SSB positions, wherein the SSB pattern identifies a subset of the set of SSB beams to use per SSB burst.

In some aspects, at 704, the network entity signals information regarding the pattern via a remaining minimum system information (RMSI) information element (IE).

In some aspects, at 706, the network entity signals, to at least one user equipment (UE), which SSBs are transmitted in which SSB burst.

In some aspects, at 708, the network entity signals, for a set of SSB bursts, the set of SSB positions per SSB burst for transmitting SSBs.

In some aspects, at 710, the network entity signals a parameter indicating an SSB position per SSB burst to allow a UE to perform rate matching in each SSB burst.

At 712, the network entity transmits SSBs over the multiple SSB bursts in accordance with the pattern.

Figure 8:
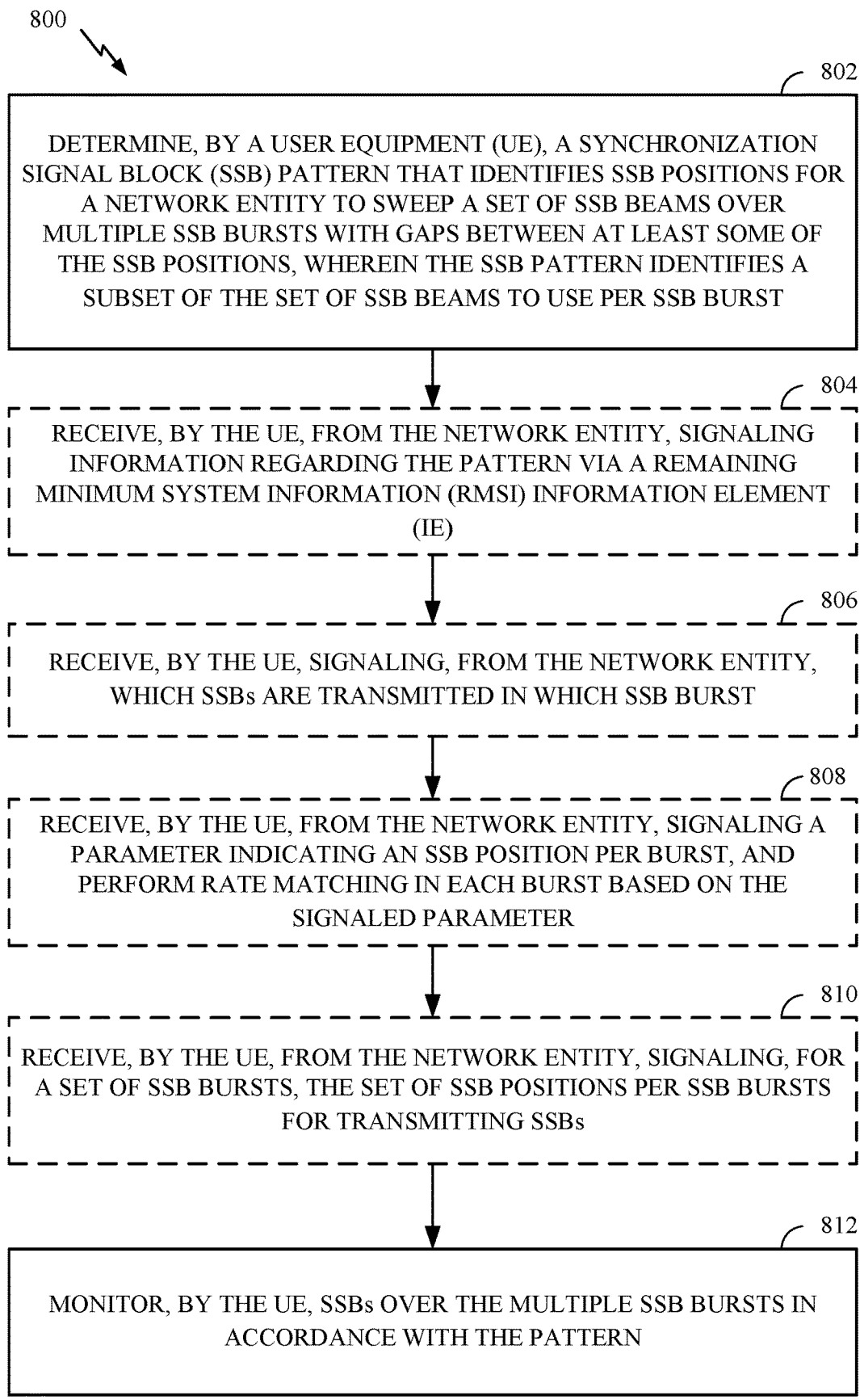
FIG. 8 is a flow diagram illustrating example operations for wireless communication by a UE, according to certain aspects of the present disclosure.

FIG. 8 is a flow diagram illustrating example operations 800 for wireless communication, in accordance with certain aspects of the present disclosure. The operations 800 may be performed, for example, by UE (e.g., such as a UE 120a in the wireless communication network 100). The operations 800 may be complementary operations by the UE to the operations 700 performed by the network entity.

Operations 800 begin, at 802, by determining a SSB pattern that identifies SSB positions for a network entity to sweep a set of SSB beams over multiple SSB bursts with gaps between at least some of the SSB positions, wherein the SSB pattern identifies a subset of the set of SSB beams to use per SSB burst.

In some aspects, at 804, the UE receives, from the network entity, signaling information regarding the pattern via an RMSI IE.

In some aspects, at 806, the UE receives, from the network entity, signaling of which SSBs are transmitted in which SSB burst.

In some aspects, at 808, the UE receives, from the network entity, signaling of a parameter indicating an SSB position per SSB burst, and the UE performs rate matching in each SSB burst based on the signaled parameter.

In some aspects, at 810, the UE receives, from the network entity, signaling, for a set of SSB bursts, the set of SSB positions per SSB bursts for transmitting SSBs.

At 812, the UE monitors SSBs over the multiple SSB bursts in accordance with the pattern.

Figure 9A:
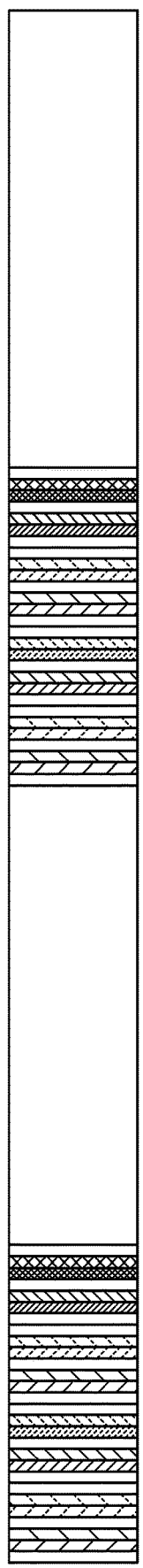
FIGS. 9A and 9B illustrate examples of SSB patterns, according to certain aspects of the present disclosure.
Figure 9B:
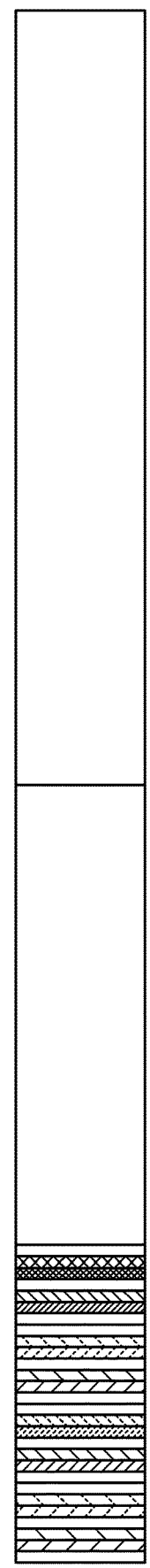

Generally, beam sweeping is completed in a single SSB burst set. FIG. 9A illustrates an example SSB pattern where beam sweeping may be completed in the first SSB burst set, and the complete beam sweeping repeats with the same SSB pattern in the second SSB burst set. However, there are few gaps between the SSB beams in the SSB burst set. FIG. 9B illustrates an example SSB pattern where beam sweeping is completed in the first SSB burst set with an increased SSB burst period in order to reduce overhead. This example SSB pattern, however, does not address the reduced space for other beams to be transmitted despite the increased burst period.

As noted above, aspects of the present disclosure provide techniques for introducing gaps in the SSB burst pattern while not increasing the maximum SSB burst length (e.g., 5 ms for 120 kHz SCS) or reducing the number of beams supported. Aspects of the present disclosure also try reduce specification impact and allow the SSB burst pattern to be backwards compatible.

The network entity sweeps up to 64 SSB beams over multiple SSB bursts without changing the SSB pattern in time. According to aspects, the network entity and/or the UE determines an SSB pattern for sweeping a set of SSB beams over multiple SSB bursts with gaps between some of the SSB transmissions. The network entity and/or UE transmits and/or monitors SSBs over the multiple SSB burst in accordance with the pattern. In some cases, the network entity and/or UE provides signaling information regarding the pattern via a RMSI IE.

Figure 10:
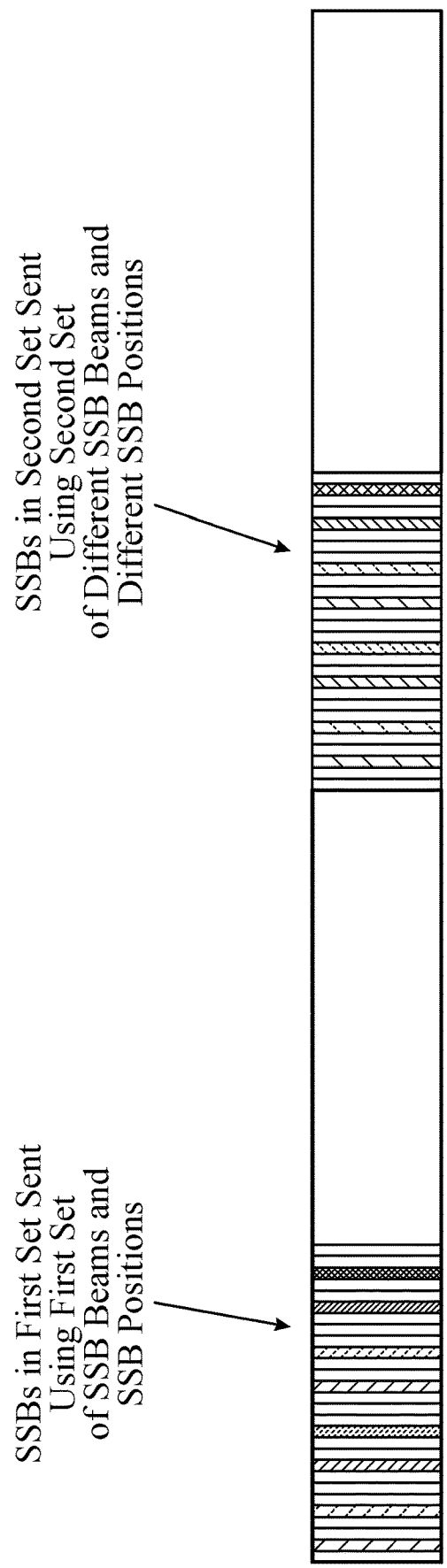
FIG. 10 illustrates an example of an SSB pattern with gaps over multiple SSB bursts, according to certain aspects of the present disclosure.

FIG. 10 illustrates an example SSB pattern with gaps between SSB beams over multiple SSB bursts. According to aspects, the SSB pattern involves sending SSBs over different subsets of SSB beams per SSB burst. For example, in the illustrated example, a first subset of SSB beams are swept during the first SSB burst, and a second subset of SSB beams are swept during the second SSB burst.

The SSB beams in each subset are different in the illustrated example, and SSBs in different subsets are sent at different SSB positions. For example, one subset may include SSB beams located at even-numbered SSB indices and the other subset may include SSB beams located at odd-numbered SSB indices. The example pattern with gaps increases the period in which SSB beams are transmitted, while an increase in the periodicity of SSB burst transmission would create a longer SSB burst, in which URLLC traffic is hard to time-division multiplex (TDM) in. Accordingly, the inclusion of gaps between SSB beams in the SSB pattern allows for multiplexing of other data (e.g., URLLC traffic). While the example of FIG. 10 illustrates two sets of SSBs, any number of sets may be used in any number of SSB bursts to complete the beam sweeping.

As mentioned, the network entity determines an SSB pattern that identifies a different subset of SSBs to use per SSB burst. The SSBs are transmitted using SSB beams at a certain location (identified by an SSB index), which may be quasi-colocated (QCLed), but SSBs may not be transmitted by the same SSB beam in each SSB burst. Beam sweeping may be performed over a longer period of time and may need multiple SSB bursts to complete a full SSB beam sweep. The initial SSB search may require more time (e.g., multiple SSB bursts or periods), or the period may be smaller to compensate.

In some cases, the UE may be aware of which SSBs beams are in each SSB burst after connecting to the network entity. The network entity may provide signaling (e.g., radio resource control (RRC) signaling) to provide information on the SSB beams in each SSB burst and on rate matching behavior. In NR, physical downlink shared channel (PDSCH) transmission may rate match around SSBs as indicated by an RRC parameter (e.g., ssb-PositionInBurst). The SSB pattern may apply to each SSB burst, but the SSB pattern determined by the network entity may not be the same in each SSB burst. According to some cases, an RRC parameter (e.g., ssb-PositionInBurst) may indicate the union of SSB positions across multiple SSB bursts. The network entity may introduce an RRC parameter (e.g., ssb-PositionPerBurst) to tell the UE how to rate match in each SSB burst if configured. In some examples, the network entity may define a period for a configuration of the per burst SSB pattern for each period.

In some cases, the network entity may determine how the SSBs are transmitted in each SSB burst. This determination by the network entity may depend on the need for URLLC traffic. In some cases, the SSBs in each SSB bursts may have spacing in between to allow for multiplexing of other urgent traffic.

The physical broadcast channel (PBCH) payload may be the same as the SSB pattern used in FR2 (e.g., same single frequency network (SFN), same half frame index, same SSB index). Accordingly, a UE may recover timing after detecting the SSB pattern regardless of whether the pattern is used in FR2 or in the 60 GHz band.

For the initial access in SSB beam sweeping, the NR UE may assume an SSB periodicity of 20 ms. When the network entity determines subsets of SSB beams and places each subset in a different SSB burst, a SSB beam sweep may take up to 40 ms if each SSB burst period is 20 ms. In some examples, the network entity can transmit SSBs with the SSB burst period of 10 ms and completes beam sweeping every 20 ms, thereby reducing the impact on the initial access beam search.

In some cases, for an SSB burst period of the SSB pattern with gaps that is the same as SSB burst period as in FR2, the overall measurement time for radio link monitoring (RLM) and/or radio resource management (RRM) measurements may be longer. By splitting the SSB pattern amongst multiple SSB bursts, the measurement time may depend on the number of SSB bursts. For example, when SSBs are transmitted using subsets of SSB beams in two different SSB bursts, the RLM and/or RRM measurement time may double. In some cases, an RRC parameter (e.g., ssb-PositionPerBurst) can be provided for RLM and/or RRM measurement. With the RRC parameter, the UE may perform micro-sleep between SSB transmissions during the gaps to compensate for the power consumption loss due to the longer measurement time.

The SSB pattern with gaps for the 60 GHz band may coexist with the SSB pattern used in FR2 and with other SSB patterns. The network may decide between using the SSB pattern used in FR2 and the SSB pattern with gaps for the 60 GHz band depending on various factors. For example, the network may decide to use the SSB pattern with gaps for the 60 GHz band for URLLC traffic. In some cases, the SSB pattern disclosed herein may be understood by introducing new IEs in RMSI after the network entity reads the RMSI.

In some cases, physical random access channel (PRACH) transmissions may not have any impact on the SSB pattern with gaps for the 60 GHz band. However, some PRACH opportunities may be mapped from an SSB index.

Figure 11:
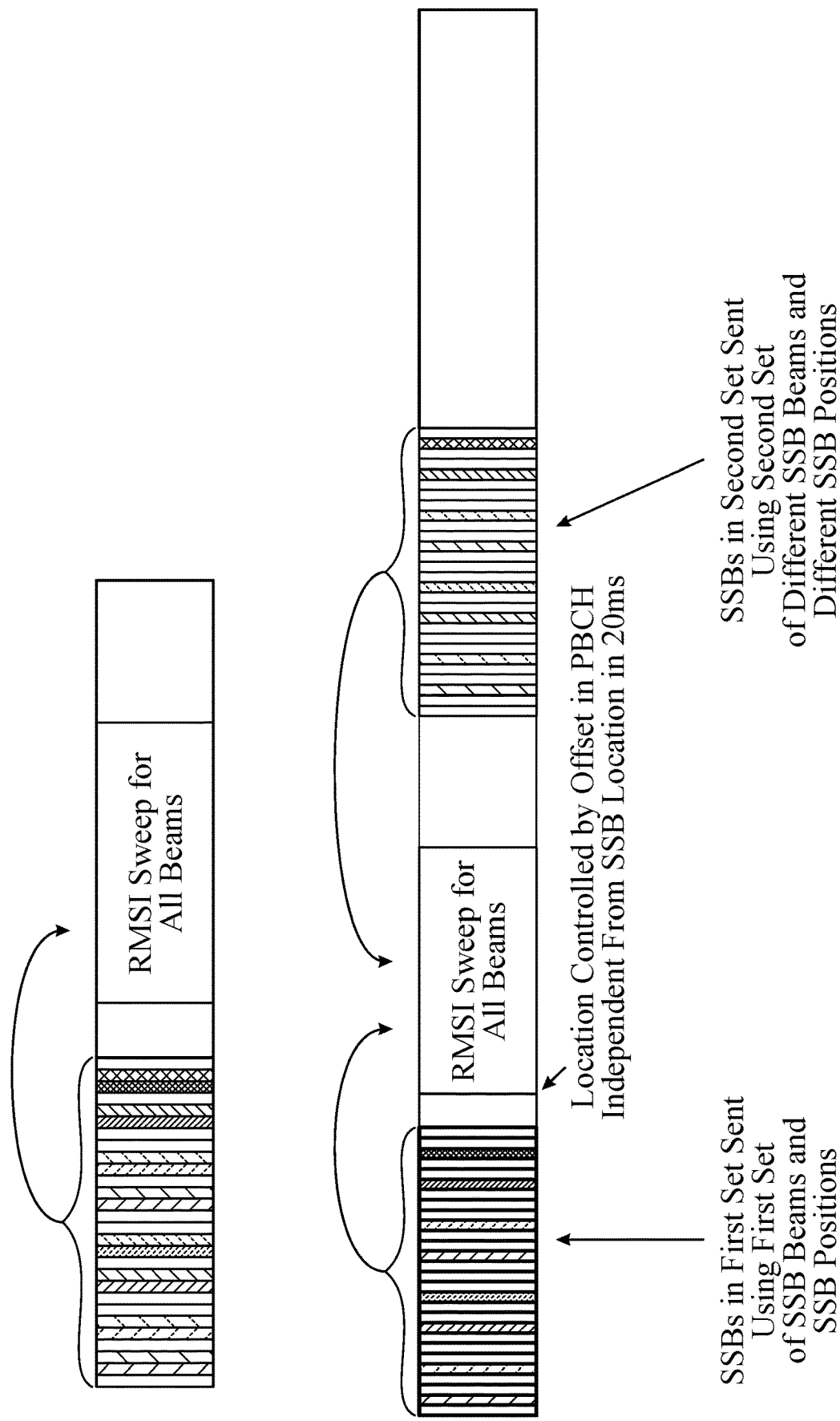
FIG. 11 illustrates one example mapping of SSBs to physical downlink control channel (PDCCH) resources, according to certain aspects of the present disclosure.

FIG. 11 illustrates an example of Type® physical downlink control channel (PDCCH) monitoring used with the SSB pattern with gaps for the 60 GHz band. Based on detected SSBs, a UE monitors for PDCCH scheduling a physical downlink shared channel (PDSCH) carrying RMSI. Type® PDCCH monitoring may work for SSB pattern used in FR2 and the SSB pattern with gaps for the 60 GHz band. Generally, Type® PDCCH monitoring involves a mapping of SSBs to PDCCH resources to monitor. In one example, the SSB pattern with gaps for the 60 GHz band may put the Type® PDCCH transmissions for all beams together (e.g., all SSBs map to the same PDCCH resources). As illustrated in FIG. 11, the Type® PDCCH transmissions (RMSI sweeping for all beams) for both subsets of SSB beams in the SSB bursts are put together. An offset may be used with this example of the Type® PDCCH monitoring with respect to the beginning of a SSB burst window. As a result, the resources for Type® PDCCH monitoring may not depend on where the SSB is detected.

Figure 12:
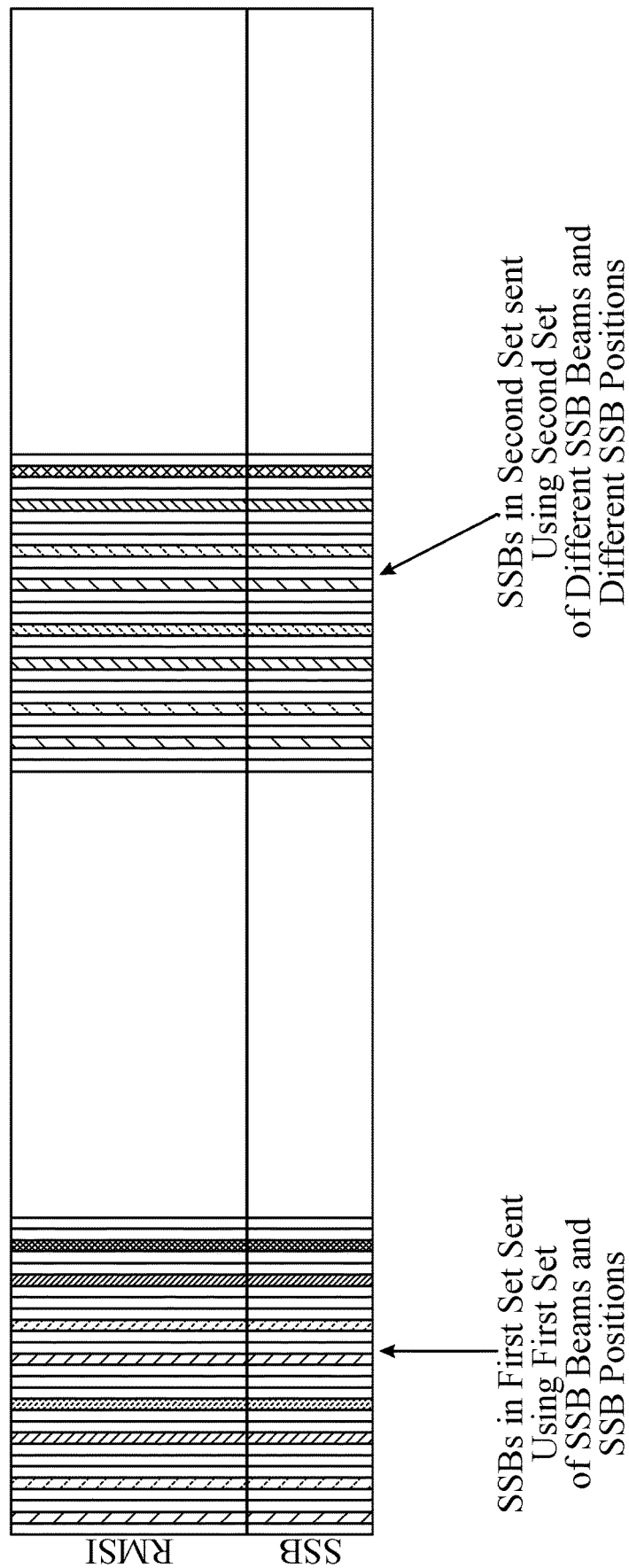
FIG. 12 illustrates an example of frequency division multiplexing PDCCH and remaining minimum system information (RMSI) resources with SSBs, according to certain aspects of the present disclosure.

FIG. 12 illustrates another example of Type® PDCCH monitoring used with a SSB pattern with gaps in the 60 GHz band. In this example, Type® PDCCH monitoring and RMSI physical downlink shared channel (PDSCH) transmissions may be frequency division multiplexed (FDMed) together with the SSBs of the same QCL according to the SSB pattern with gaps in the 60 GHz band. The Type® PDCCH and RMSI PDSCH may be in the same SSB burst as the corresponding SSB. When a UE detects an SSB, the UE may monitor the Type® PDCCH transmission at the located position in later SSB bursts. This monitoring may depending on the SSB burst period (e.g., 20 ms spacing). If the SSB burst period is 20 ms, the QCLed Type® PDCCH transmission may be transmitted every 40 ms. In some cases, if the UE waits longer, the UE may see the RMSI transmissions (FDMed with SSBs). If the SSB burst period is 10 m with a full sweeping of 20 ms, the QCLed Type® PDCCH transmission may be transmitted every 20 ms at the same location. Accordingly, the UE may maintain detection performance between the SSB pattern disclosed herein and the SSB pattern used in FR2.

Figure 13:
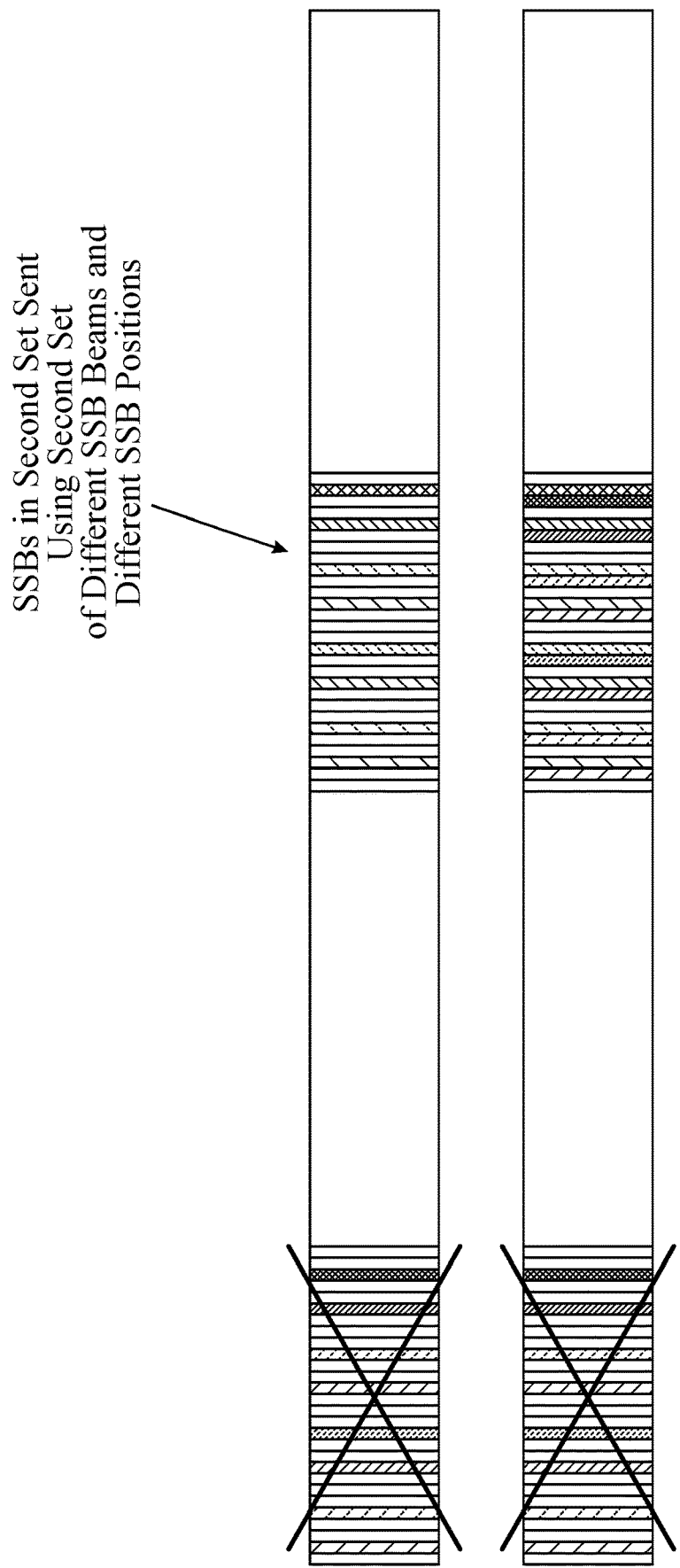
FIG. 13 is an example of an SSB pattern with gaps over multiple SSB bursts in the case of listen-before-talk process, according to certain aspects of the present disclosure.

FIG. 13 illustrates an example of a listen-before-talk (LBT) process used with the SSB pattern with gaps in the 60 GHz band. Because the 60 GHz band is in the unlicensed band, a channel transmission in the band is subject to an LBT process and such LBT process may fail, in which the transmission (of the SSB burst) may not occur. Accordingly, if a SSB burst fails to transmit because of the LBT process as illustrated in the crossed out SSB burst, SSBs may be transmitted by multiplexing with other SSBs in other SSB burst. In some cases, if a SSB burst fails to transmit because of the LBT process, the SSBs may be transmitted in the next SSB burst along with the SSB originally to be transmitted in the next SSB burst according to the SSB pattern with gaps.

According to some cases, the network entity may not perform rate matching around these SSBs because rate matching is configured via RRC. However, a schedule may avoid scheduling the resources. In some cases, opportunities for transmission may be available more even if the LBT did not fail. For example, the SSB beams may have been designated for URLLC but there is no URLLC traffic in the particular SSB burst, and so SSBs may be transmitted using the SSB beams designated for URLLC. In some cases, the transmission may not need a full SSB burst. The transmission may require a subset of the SSB beams of the SSB burst, which may depend on the presence of URLLC traffic.

Figure 14:
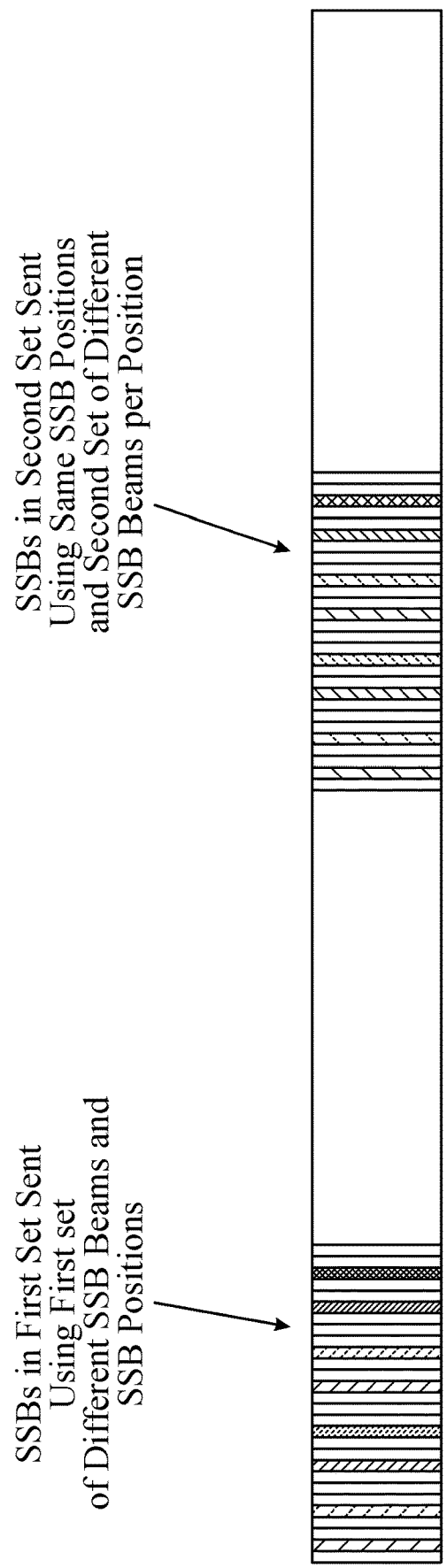
FIG. 14 is an example of a SSB pattern with gaps over multiple SSB bursts, according to certain aspects of the present disclosure.

FIG. 14 illustrates an example SSB pattern with gaps and shifted SSB beams in the 60 GHz band. In the illustrated example, the same SSB positions are used in each burst, but different SSB beams are used per SSB position. According to aspects, the SSB pattern involves a set of SSB positions in the SSB pattern to send SSBs, and for each subset of SSB beams, the network sends SSBs over each subset of SSB beams using the selected SSB positions in each SSB burst. In such aspects, each SSB burst may have a different set of SSB beams in the selected positions.

According to aspects, the same set of SSB positions are transmitted in each SSB bursts while the QCL assumption for SSBs at the same position in different SSB bursts may be different (e.g., different beams/spatial QCL assumptions). In some cases, RRC signaling may indicate the same SSB position while the QCL assumption is every N SSB bursts, instead of every SSB burst. In some cases, the network entity may perform rate matching for the SSB pattern with gaps and shifted SSBs similar to the rate matching for the SSB pattern in FR2. The rate matching behavior may remain the same with respect to an RRC parameter (e.g., ssb-PositionInBurst). However, in some cases, beam tracking may be impacted.

In NR, PDSCH transmission may rate match around an SSB as indicated by an RRC parameter (e.g., ssb-PositionInBurst). In some cases, the same pattern may apply for each SSB burst because the SSB positions are the same between the multiple SSB bursts, even though the SSB pattern is not the same in different SSB burst. In some systems, the RRC parameter (e.g., ssb-PositionInBurst) may be the same as in Release 15 but the QCL may be different.

As mentioned, the SSB pattern with gaps may coexist with the SSB pattern used in FR2 and with other patterns used in other frequency ranges. In some cases, the network entity may be able to choose between different SSB patterns regardless what frequency range the SSB pattern was designed for. In some cases, the RRC parameters are introduced in RMSI to indicate the SSBs are only QCLed every N SSB bursts. Accordingly, when N is configured, the UE may assume QCL of SSBs of the same index and same SSB burst index depending on the value of N.

Figure 15:
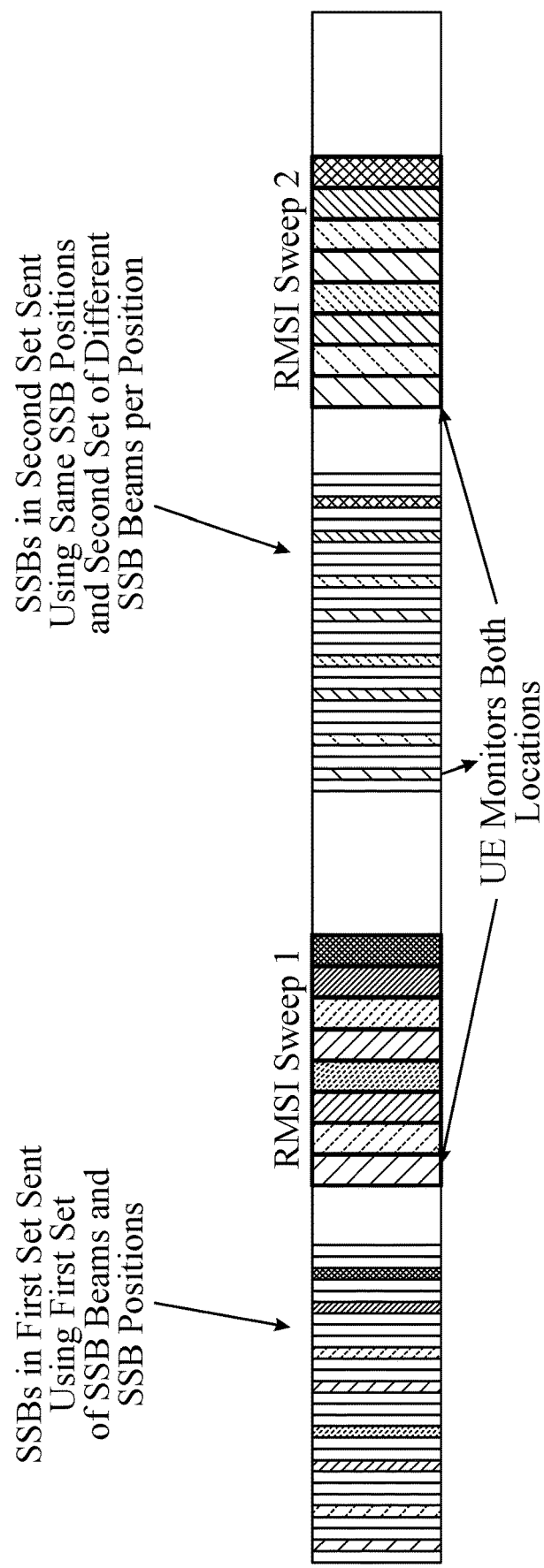
FIG. 15 illustrates another example mapping of SSBs to PDCCH resources, according to certain aspects of the present disclosure.

FIG. 15 illustrates an example of Type0 PDCCH monitoring with the SSB pattern with gaps and shifted SSB beams. As illustrated, for the same SSB position in different bursts, the UE may monitor both locations for PDCCH scheduling a PDSCH carrying RMSI QCLed with the two corresponding SSB beams.

As with the SSB pattern with gaps mentioned earlier, Type0 PDCCH monitoring works for the SSB pattern with gaps and shifted SSB beams. In one example, the Type0 PDCCH transmission for all beams together may be put together. The offset may be used with the SSB pattern with gaps and shifted beams with respect to the beginning of the full SSB burst period (e.g., a 20 ms window). However, because the SSB pattern may have shifted SSB beams, two SSBs with different QCL may have the same SSB index/position. In some cases, the mapping of SSBs to Type0 PDCCH transmissions used in FR2 may be used to map SSBs at the same position. In some cases, the network entity may transmit with one QCL at a time due to analog beam limitation. In one case, each SSB may have two non-overlapping opportunities for Type0 PDCCH monitoring, and the network entity may transmit Type0 PDCCH transmission for each of the two beams. In some cases, the network entity may transmit RMSI, PDCCH, and/or PDSCH for one of the beams (out of the multiple beams mapping to the same SSB index) at a time. The network entity may alternate the beams over different RMSI sweeps. The UE may detect the RMSI for the detected SSB index and may decide the RMSI with the matching beam. In some cases, the RMSI of other SSB beams may be decodable as well.

Figure 16:
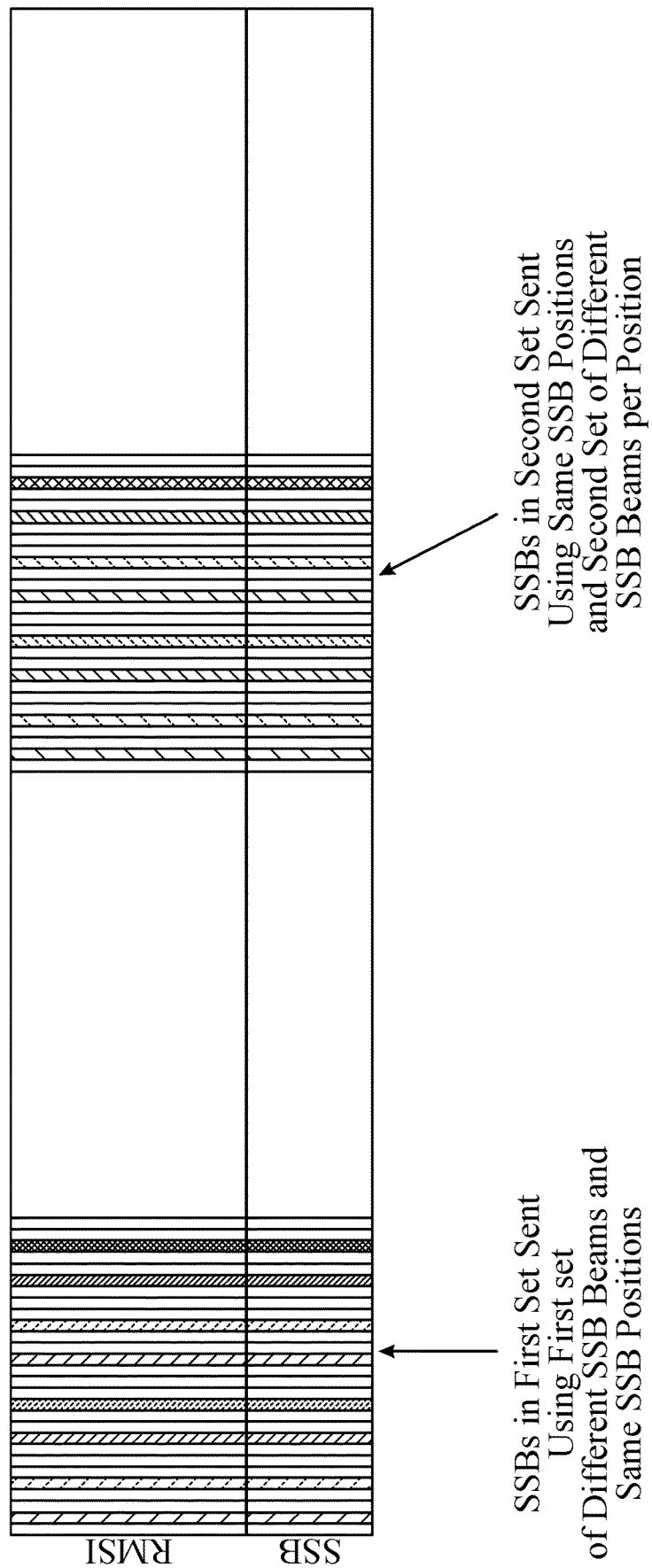
FIG. 16 illustrates another example of frequency division multiplexing PDCCH and RMSI resources with SSBs, according to certain aspects of the present disclosure.

FIG. 16 is an example of Type0 PDCCH monitoring with a SSB pattern with gaps and shifted SSB beams, according to aspects of the present disclosure. In one example, Type0 PDCCH transmissions and RMSI PDSCH transmissions are FDMed together with the SSBs of the same QCL. The UE may attempt to decode Type0 PDCCH transmissions frequency-division multiplexed with the SSB. In some cases, the UE may encounter Type0 PDCCH transmissions of other non-QCLed SSBs. In such cases, there is little to no impact on UE processing and if the UE cannot decode the Type0 PDCCH and/or the RMSI with the wrong QCL, the UE can try during another SSB burst.

Figure 17:
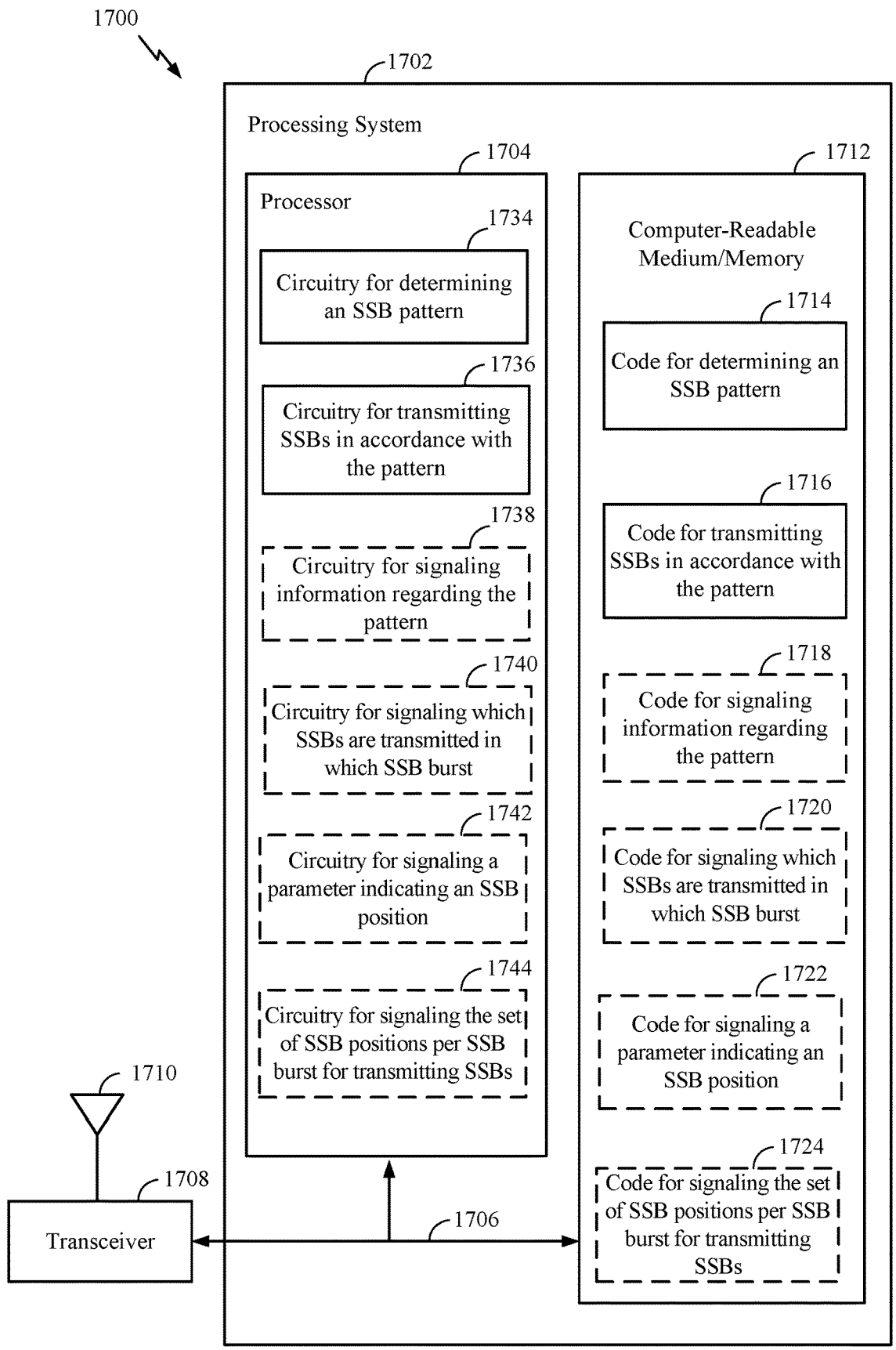
FIG. 17 illustrates a communications device that may include various components configured to perform operations for the techniques disclosed herein in accordance with certain aspects of the present disclosure.

FIG. 17 illustrates a communications device 1700 that may include various components (e.g., corresponding to means-plus-function components) configured to perform operations for the techniques disclosed herein, such as the operations illustrated in FIG. 7. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 7, or other operations for performing the various techniques discussed herein for transmitting SSBs according to patterns with gaps. In certain aspects, computer-readable medium/memory 1712 stores code 1714 for determining an SSB pattern that identifies SSB positions for sweeping a set of SSB beams over multiple SSB bursts with gaps between at least some of the SSB positions, wherein the SSB pattern identifies a subset of the set of SSB beams to use per SSB burst; and code 1716 for transmitting SSBs over the multiple SSB bursts in accordance with the SSB pattern. In certain aspects, computer-readable medium/memory 1712 may store code 1718 for signaling information regarding the pattern via a RMSI IE. In certain aspects, computer-readable medium/memory 1712 may store code 1720 for signaling, to at least one UE, which SSBs are transmitted in which SSB burst. In certain aspects, computer-readable medium/memory 1712 may store code 1722 for signaling, for a set of SSB bursts, the set of SSB positions per SSB burst for transmitting SSBs. In certain aspects, computer-readable medium/memory 1712 may store code 1724 for signaling a parameter indicating an SSB position per SSB burst to allow a UE to perform rate matching in each SSB burst. In certain aspects, the processor 1704 has circuitry configured to implement the code stored in the computer-readable medium/memory 1712. The processor 1704 includes circuitry 1734 for determining an SSB pattern that identifies SSB positions for sweeping a set of SSB beams over multiple SSB bursts with gaps between at least some of the SSB positions, wherein the SSB pattern identifies a subset of the set of SSB beams to use per SSB burst; and circuitry 1736 for transmitting SSBs over the multiple SSB bursts in accordance with the SSB pattern. In certain aspects, processor 1704 may include circuitry 1738 for signaling information regarding the pattern via a RMSI IE. In certain aspects, processor 1704 may include circuitry 1740 for signaling, to at least one UE, which SSBs are transmitted in which SSB burst. In certain aspects, processor 1704 may include circuitry 1742 for signaling, for a set of SSB bursts, the set of SSB positions per SSB burst for transmitting SSBs. In certain aspects, processor 1704 may include circuitry 1744 for signaling a parameter indicating an SSB position per SSB burst to allow a UE to perform rate matching in each SSB burst.

For example, means for transmitting (or means for outputting for transmission) may include a transmitter and/or an antenna(s) 234 or the BS 110a and/or circuitry 1734 of the communication device 1700 in FIG. 17. Means for receiving (or means for obtaining) may include a receiver and/or an antenna(s) 234 of the BS 110a illustrated in FIG. 2. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1702 of the communication device 1700 in FIG. 17.

Figure 18:
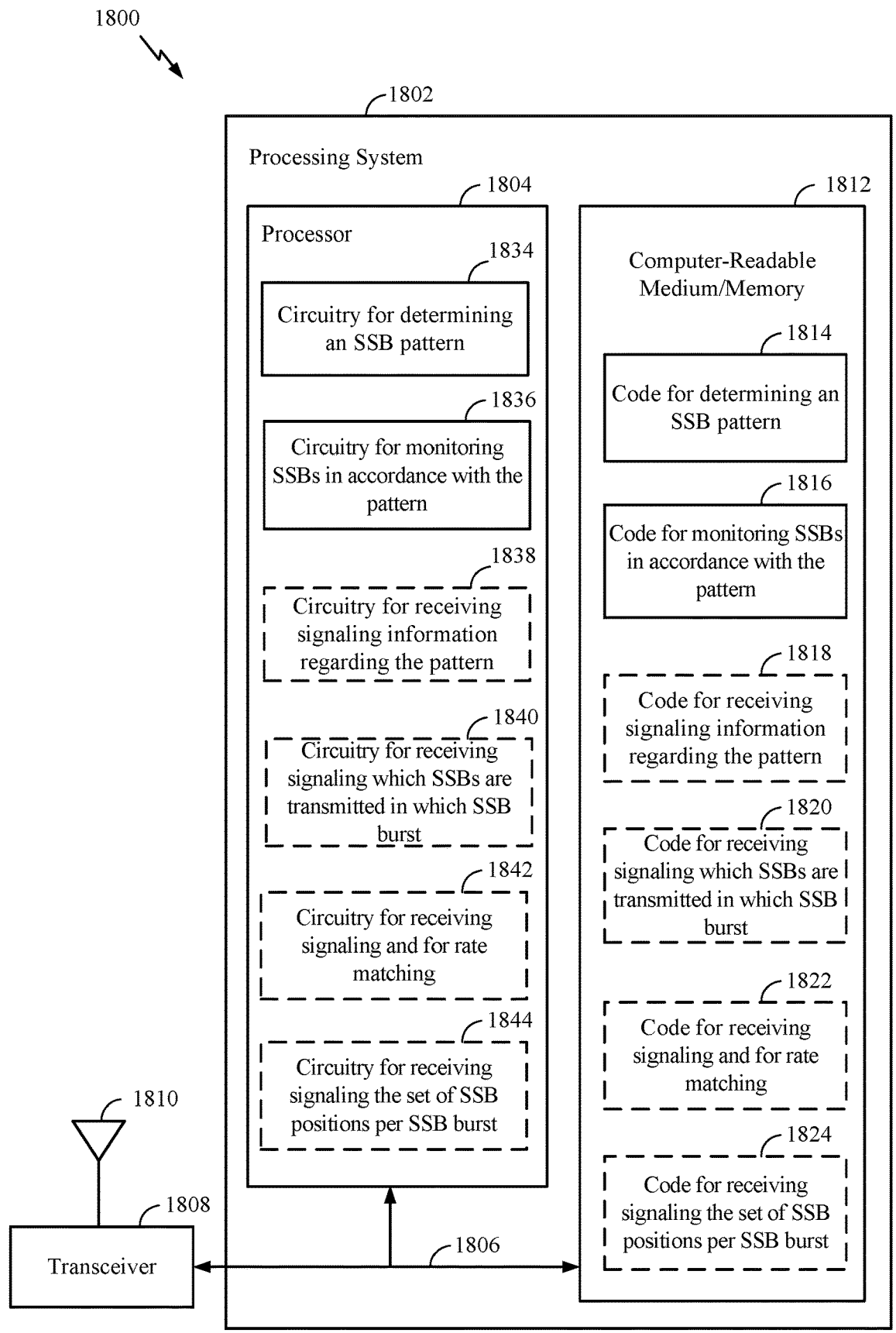
FIG. 18 illustrates a communications device that may include various components configured to perform operations for the techniques disclosed herein in accordance with certain aspects of the present disclosure.

FIG. 18 illustrates a communications device 1800 that may include various components (e.g., corresponding to means-plus-function components) configured to perform operations for the techniques disclosed herein, such as the operations illustrated in FIG. 8. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 8, or other operations for performing the various techniques discussed herein for transmitting SSBs according to patterns with gaps. In certain aspects, computer-readable medium/memory 1812 stores code 1814 for determining an SSB pattern that identifies SSB positions for a network entity to sweep a set of SSB beams over multiple SSB bursts with gaps between at least some of the SSB positions, wherein the SSB pattern identifies a subset of the set of SSB beams to use per SSB burst; and code 1816 for monitoring SSBs over the multiple SSB bursts in accordance with the SSB pattern. In certain aspects, computer-readable medium/memory 1812 may store code 1818 for receiving, from the network entity, signaling information regarding the pattern via an RMSI IE. In certain aspects, computer-readable medium/memory 1812 may store code 1820 for receiving signaling, from the network entity, which SSBs are transmitted in which SSB burst. In certain aspects, computer-readable medium/memory 1812 may store code 1822 for receiving, from the network entity, signaling a parameter indicating an SSB position per burst and for performing rate matching in each burst based on the signaled parameter. In certain aspects, computer-readable medium/memory 1812 may store code 1824 for receiving, from the network entity, signaling, for a set of SSB bursts, the set of SSB positions per SSB burst for transmitting SSBs. In certain aspects, computer-readable medium/memory 1812 may store code. In certain aspects, the processor 1804 has circuitry configured to implement the code stored in the computer-readable medium/memory 1812. The processor 1804 includes circuitry 1834 for determining an SSB pattern that identifies SSB positions for a network entity to sweep a set of SSB beams over multiple SSB bursts with gaps between at least some of the SSB positions, wherein the SSB pattern identifies a subset of the set of SSB beams to use per SSB burst; and circuitry 1836 for monitoring SSBs over the multiple SSB bursts in accordance with the SSB pattern. In certain aspects, processor 1804 may include circuitry 1838 for receiving, from the network entity, signaling information regarding the pattern via an RMSI IE. In certain aspects, processor 1804 may include circuitry 1840 for receiving signaling, from the network entity, which SSBs are transmitted in which SSB burst. In certain aspects, processor 1804 may include circuitry 1842 for receiving, from the network entity, signaling a parameter indicating an SSB position per burst and for performing rate matching in each burst based on the signaled parameter. In certain aspects, processor 1804 may include circuitry 1844 for receiving, from the network entity, signaling, for a set of SSB bursts, the set of SSB positions per SSB burst for transmitting SSBs.

For example, means for transmitting (or means for outputting for transmission) may include the transmitter unit 254 and/or antenna(s) 252 of the UE 120a illustrated in FIG. 2 an. Means for receiving (or means for obtaining) may include a receiver and/or antenna(s) 252 of the UE 120a illustrated in FIG. 2 and/or circuitry 1836 of the communication device 1800 in FIG. 18. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1802 of the communication device 1800 in FIG. 18.

EXAMPLE ASPECTS

Implementation examples are described in the following numbered aspects:

Aspect 1: A method for wireless communication for a network entity, comprising: determining a synchronization signal block (SSB) pattern that identifies SSB positions for sweeping a set of SSB beams over multiple SSB bursts with gaps between at least some of the SSB positions, wherein the SSB pattern identifies a subset of the set of SSB beams to use per SSB burst; and transmitting SSBs over the multiple SSB bursts in accordance with the pattern.

Aspect 2: The method of aspect 1, further comprising signaling information regarding the pattern via a remaining minimum system information (RMSI) information element (IE).

Aspect 3: The method of any of aspects 1-2, wherein the subset of the set of SSB beams to use per SSB burst in the SSB pattern is different between each SSB burst.

Aspect 4: The method of aspect 3, wherein the pattern identifies a first subset of SSB beams to use at a corresponding first subset of SSB positions in a first SSB burst; and a second subset of SSB beams to use at a corresponding second subset of SSB positions in a second SSB burst, wherein the first and second subsets of SSB positions are non-overlapping.

Aspect 5: The method of any of aspects 3-4, wherein SSBs at a certain SSB position within an SSB burst share common quasi co-location (QCL) assumptions.

Aspect 6: The method of any of aspects 3-5, further comprising signaling, to at least one UE, which SSBs are transmitted in which SSB burst.

Aspect 7: The method of any of aspects 3-6, further comprising signaling a parameter indicating an SSB position per burst to allow a UE to perform rate matching in each burst.

Aspect 8: The method of any of aspects 3-7, wherein each SSB within a first SSB burst and a second SSB burst indicates an offset to a same physical downlink control channel (PDCCH) burst that schedules remaining minimum system information (RMSI).

Aspect 9: The method of any of aspects 3-8, wherein the network entity multiplexes, via frequency division multiplexing (FDM), physical downlink control channel (PDCCH) and corresponding remaining minimum system information (RMSI) together with SSBs that share quasi co-location (QCL) assumptions.

Aspect 10: The method of any of aspects 3-9, wherein, if transmission of one SSB burst fails due to a clear channel assessment (CCA) failure, the SSBs of the failed SSB burst are multiplexed in one or more other SSB bursts.

Aspect 11: The method of any of aspects 1-10, wherein the pattern identifies a set of SSB positions per SSB burst for transmitting SSBs; and in different SSB bursts, different SSB beams per the same SSB position.

Aspect 12: The method of aspect 11, further comprising signaling, for a set of SSB bursts, the set of SSB positions per SSB burst for transmitting SSBs.

Aspect 13: The method of any of aspects 11-12, wherein SSBs at a certain SSB position every N SSB bursts share common quasi co-location (QCL) assumptions.

Aspect 14: The method of any of aspects 11-13, wherein SSBs at a same position in multiple bursts map to a same physical downlink control channel (PDCCH) that schedules remaining minimum system information (RMSI) while the PDCCH and a corresponding remaining minimum system information (RMSI) share the same quasi co-location assumption with one of the SSBs at the same position in multiple bursts at a time.

Aspect 15: A method for wireless communication for a user equipment (UE), comprising determining a synchronization signal block (SSB) pattern that identifies SSB positions for a network entity to sweep a set of SSB beams over multiple SSB bursts with gaps between at least some of the SSB positions, wherein the SSB pattern identifies a subset of the set of SSB beams to use per SSB burst; and monitoring SSBs over the multiple SSB bursts in accordance with the pattern.

Aspect 16: The method of aspect 15, further comprising receiving, from the network entity, signaling information regarding the pattern via a remaining minimum system information (RMSI) information element (IE).

Aspect 17: The method of any of aspects 15-16, wherein the subset of the set of SSB beams to use per SSB burst of the SSB pattern is different between each SSB burst.

Aspect 18: The method of aspect 17, wherein the pattern identifies a first subset of SSB beams to use at a corresponding first subset of SSB positions in a first SSB burst; and a second subset of SSB beams to use at a corresponding second subset of SSB positions in a second SSB burst, wherein the first and second subsets of SSB positions are non-overlapping.

Aspect 19: The method of any of aspects 17-18, wherein SSBs at a certain SSB position within an SSB burst share common quasi co-location (QCL) assumptions.

Aspect 20: The method of any of aspects 17-19, further comprising receiving signaling, from the network entity, which SSBs are transmitted in which SSB burst.

Aspect 21: The method of any of aspects 17-20, further comprising receiving, from the network entity, signaling a parameter indicating an SSB position per burst; and performing rate matching in each burst based on the signaled parameter.

Aspect 22: The method of any of aspects 17-21, wherein each SSB within a first SSB burst and the second SSB burst indicates an offset to a same physical downlink control channel (PDCCH) burst that schedules remaining minimum system information (RMSI).

Aspect 23: The method of any of aspects 17-22, wherein the network entity multiplexes, via frequency division multiplexing (FDM), physical downlink control channel (PDCCH) and corresponding remaining minimum system information (RMSI) together with SSBs that share quasi co-location (QCL) assumptions.

Aspect 24: The method of any of aspects 17-23, wherein SSBs of one SSB burst are multiplexed in one or more other SSB bursts.

Aspect 25: The method of any of aspects 15-24, wherein the pattern identifies a set of SSB positions per SSB burst for transmitting SSBs; and in different SSB bursts, different SSB beams per the same SSB position.

Aspect 26: The method of aspect 25, further comprising receiving, from the network entity, signaling, for a set of SSB bursts, the set of SSB positions per SSB burst for transmitting SSBs.

Aspect 27: The method of any of aspects 25-26, wherein SSBs at a certain SSB position every N SSB bursts share common quasi co-location (QCL) assumptions.

Aspect 28: The method of any of aspects 25-27, wherein SSBs at a same position in multiple bursts map to a same physical downlink control channel (PDCCH) that schedules remaining minimum system information (RMSI) while the PDCCH and a corresponding remaining minimum system information (RMSI) share the same quasi co-location assumption with one of the SSBs at the same position in multiple bursts at a time.

Aspect 29: An apparatus comprising means for performing the method of any of aspects 1 through 28.

Aspect 30: An apparatus comprising at least one processor and a memory coupled to the at least one processor, the memory comprising code executable by the at least one processor to cause the apparatus to perform the method of any of aspects 1 through 28.

Aspect 31: A computer readable medium storing computer executable code thereon for wireless communications that, when executed by at least one processor, cause an apparatus to perform the method of any of aspects 1 through 28.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication, comprising:
at least one processor; and
at least one memory coupled to the at least one processor, the at least one memory comprising code executable by the at least one processor to cause the apparatus to:
determine a synchronization signal block (SSB) pattern that identifies SSB positions for sweeping a set of SSB beams over multiple SSB bursts with gaps between at least some of the SSB positions, wherein the SSB pattern identifies a different subset of the set of SSB beams to use per SSB burst in a periodicity among the multiple SSB bursts;
transmit a message indicating which SSBs are to be transmitted in which SSB burst of the multiple SSB bursts; and
transmit the SSBs over the multiple SSB bursts in accordance with the SSB pattern and the message, wherein each of the multiple SSB bursts is transmitted periodically in a different half frame.

2. The apparatus of claim 1, wherein the at least one memory further comprises code executable by the at least one processor to cause the apparatus to signal information regarding the SSB pattern via a remaining minimum system information (RMSI) information element (IE).

3. The apparatus of claim 1, wherein the SSB pattern identifies:
    a first subset of SSB beams to use at a corresponding first subset of SSB positions in a first SSB burst; and
    a second subset of SSB beams to use at a corresponding second subset of SSB positions in a second SSB burst, wherein the first and second subsets of SSB positions are non-overlapping.

4. The apparatus of claim 1, wherein SSBs at a certain SSB position within an SSB burst share common quasi co-location (QCL) assumptions.

5. The apparatus of claim 1, wherein the at least one memory further comprises code executable by the at least one processor to cause the apparatus to signal a parameter indicating an SSB position per burst to allow a UE to perform rate matching in each burst.

6. The apparatus of claim 1, wherein each SSB within a first SSB burst and a second SSB burst indicates an offset to a same physical downlink control channel (PDCCH) burst that schedules remaining minimum system information (RMSI).

7. The apparatus of claim 1, wherein the at least one memory further comprises code executable by the at least one processor to cause the apparatus to multiplex, via frequency division multiplexing (FDM), physical downlink control channel (PDCCH) and corresponding remaining minimum system information (RMSI) together with SSBs that share quasi co-location (QCL) assumptions.

8. The apparatus of claim 1, wherein, if transmission of one SSB burst fails due to a clear channel assessment (CCA) failure, the SSBs of the failed SSB burst are multiplexed in one or more other SSB bursts.

9. The apparatus of claim 1, wherein the SSB pattern identifies:
    a set of SSB positions per SSB burst for transmitting SSBs; and
    in different SSB bursts, different SSB beams per a same SSB position.

10. The apparatus of claim 9, wherein the at least one memory further comprises code executable by the at least one processor to cause the apparatus to signal, for a set of SSB bursts, the set of SSB positions per SSB burst for transmitting SSBs.

11. The apparatus of claim 9, wherein SSBs at a certain SSB position every N SSB bursts share common quasi co-location (QCL) assumptions.

12. The apparatus of claim 9, wherein SSBs at a same position in multiple bursts map to a same physical downlink control channel (PDCCH) that schedules remaining minimum system information (RMSI) while the PDCCH and a corresponding remaining minimum system information (RMSI) share a same quasi co-location assumption with one of the SSBs at the same position in multiple bursts at a time.

13. An apparatus for wireless communication, comprising:
    at least one processor; and
    at least one memory coupled to the at least one processor, the at least one memory comprising code executable by the at least one processor to cause the apparatus to:
        determine a synchronization signal block (SSB) pattern that identifies SSB positions for a network entity to sweep a set of SSB beams over multiple SSB bursts with gaps between at least some of the SSB positions, wherein the SSB pattern identifies a different subset of the set of SSB beams to use per SSB burst in a periodicity among the multiple SSB bursts;
        receive a message indicating which SSBs are to be transmitted in which SSB burst of the multiple SSB bursts; and
        monitor SSBs over the multiple SSB bursts in accordance with the SSB pattern and the message, wherein each of the multiple SSB bursts is monitored in a different half frame.

14. The apparatus of claim 13, wherein the at least one memory further comprises code executable by the at least one processor to cause the apparatus to receive, from the network entity, signaling information regarding the SSB pattern via a remaining minimum system information (RMSI) information element (IE).

15. The apparatus of claim 13, wherein the SSB pattern identifies:
    a first subset of SSB beams to use at a corresponding first subset of SSB positions in a first SSB burst; and
    a second subset of SSB beams to use at a corresponding second subset of SSB positions in a second SSB burst, wherein the first and second subsets of SSB positions are non-overlapping.

16. The apparatus of claim 13, wherein SSBs at a certain SSB position within an SSB burst share common quasi co-location (QCL) assumptions.

17. The apparatus of claim 13, wherein the at least one memory further comprises code executable by the at least one processor to cause the apparatus to:
    receive, from the network entity, a parameter indicating an SSB position per burst; and
    perform rate matching in each burst based on the parameter.

18. The apparatus of claim 13, wherein each SSB within a first SSB burst and a second SSB burst indicates an offset to a same physical downlink control channel (PDCCH) burst that schedules remaining minimum system information (RMSI).

19. The apparatus of claim 13, wherein the at least one memory further comprises code executable by the at least one processor to cause the network entity to multiplex, via frequency division multiplexing (FDM), physical downlink control channel (PDCCH) and corresponding remaining minimum system information (RMSI) together with SSBs that share quasi co-location (QCL) assumptions.

20. The apparatus of claim 13, wherein SSBs of one SSB burst are multiplexed in one or more other SSB bursts.

21. The apparatus of claim 13, wherein the SSB pattern identifies:
    a set of SSB positions per SSB burst for transmitting SSBs; and
    in different SSB bursts, different SSB beams per a same SSB position.

22. The apparatus of claim 21, wherein the at least one memory further comprises code executable by the at least one processor to cause the apparatus to receive, from the network entity, signaling, for a set of SSB bursts, the set of SSB positions per SSB burst for transmitting SSBs.

23. The apparatus of claim 21, wherein: SSBs at a certain SSB position every N SSB bursts share common quasi co-location (QCL) assumptions.

24. The apparatus of claim 21, wherein SSBs at a same position in multiple bursts map to a same physical downlink control channel (PDCCH) that schedules remaining minimum system information (RMSI) while the PDCCH and a corresponding remaining minimum system information (RMSI) share a same quasi co-location assumption with one of the SSBs at the same position in multiple bursts at a time.

25. A method for wireless communication for a network entity, comprising:
- determining a synchronization signal block (SSB) pattern that identifies SSB positions for sweeping a set of SSB beams over multiple SSB bursts with gaps between at least some of the SSB positions, wherein the SSB pattern identifies a different subset of the set of SSB beams to use per SSB burst in a periodicity among the multiple SSB bursts;
- transmitting a message indicating which SSBs are to be transmitted in which SSB burst of the multiple SSB bursts; and
- transmitting SSBs over the multiple SSB bursts in accordance with the SSB pattern and the message, wherein each of the multiple SSB bursts is transmitted periodically in a different half frame.

26. A method for wireless communication for a user equipment (UE), comprising:
- determining a synchronization signal block (SSB) pattern that identifies SSB positions for a network entity to sweep a set of SSB beams over multiple SSB bursts with gaps between at least some of the SSB positions, wherein the SSB pattern identifies a different subset of the set of SSB beams to use per SSB burst in a periodicity among the multiple SSB bursts;
- receiving a message indicating which SSBs are to be transmitted in which SSB burst of the multiple SSB bursts; and
- monitoring SSBs over the multiple SSB bursts in accordance with the SSB pattern and the message, wherein each of the multiple SSB bursts is monitored in a different half frame.

* * * * *